(12) United States Patent
Kim et al.

(10) Patent No.: US 10,021,447 B2
(45) Date of Patent: Jul. 10, 2018

(54) RECEIVING APPARATUS AND CONTROL METHOD THEREOF

(71) Applicant: SAMSUNG ELECTRONICS CO., LTD., Suwon-si (KR)

(72) Inventors: Min-ho Kim, Hwaseong-si (KR); Jung-hyun Park, Hwaseong-si (KR); Sung-kyu Jung, Seongnam-si (KR); Doo-chan Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/217,220

(22) Filed: Jul. 22, 2016

(65) Prior Publication Data

US 2017/0214964 A1    Jul. 27, 2017

(30) Foreign Application Priority Data

Jan. 22, 2016    (KR) .................... 10-2016-0008216

(51) Int. Cl.
| | |
|---|---|
| *H04N 7/173* | (2011.01) |
| *H04N 21/434* | (2011.01) |
| *H04N 21/43* | (2011.01) |
| *H04N 21/44* | (2011.01) |
| *H04N 21/443* | (2011.01) |

(52) U.S. Cl.
CPC ..... *H04N 21/4345* (2013.01); *H04N 21/4302* (2013.01); *H04N 21/443* (2013.01); *H04N 21/44004* (2013.01)

(58) Field of Classification Search
CPC .......... H04N 21/4345; H04N 21/4302; H04N 21/44004; H04N 21/443
See application file for complete search history.

(56) References Cited

U.S. PATENT DOCUMENTS

| | | |
|---|---|---|
| 6,646,980 B1 | 11/2003 | Yamamoto et al. |
| 7,263,131 B2 | 8/2007 | Ha et al. |
| 7,539,241 B1 * | 5/2009 | Dick ....................... H04L 7/042 375/150 |

(Continued)

OTHER PUBLICATIONS

Communication dated Apr. 27, 2017, issued by the International Searching Authority in counterpart International Application No. PCT/KR2017/000621 (PCT/ISA/210 & PCT/ISA/237).

*Primary Examiner* — Fred Peng
(74) *Attorney, Agent, or Firm* — Sughrue Mion, PLLC

(57) ABSTRACT

A receiving apparatus is provided. The receiving apparatus includes: a receiver configured to receive an input signal including a transmission frame which includes a bootstrap, a preamble, and a payload; a bootstrap detector configured to detect the bootstrap based on a correlation between the input signal and a reference signal which is pre-stored; and a signal processor configured to signal-process the preamble based on the detected bootstrap and signal-process the payload based on the signal-processed preamble, and the bootstrap detector is configured to determine the correlation by quantizing at least one of the input signal and the reference signal and then multiplexing the input signal and the reference signal at least one of which is quantized. Accordingly, an area occupied by hardware and cost can be reduced and loss of performance can be minimized.

14 Claims, 24 Drawing Sheets

(56) References Cited

U.S. PATENT DOCUMENTS

| | | | |
|---|---|---|---|
| 2006/0188225 A1* | 8/2006 | Yamakage | G11B 27/005 386/331 |
| 2008/0219345 A1* | 9/2008 | Li | H04L 65/607 375/240.2 |
| 2013/0215856 A1 | 8/2013 | Joung et al. | |
| 2014/0023168 A1* | 1/2014 | Pasqualini | H04L 27/2663 375/343 |
| 2015/0071153 A1 | 3/2015 | Hong et al. | |
| 2015/0341053 A1 | 11/2015 | Kim et al. | |
| 2016/0241365 A1* | 8/2016 | Bae | H04L 5/0007 |
| 2017/0187559 A1* | 6/2017 | Michael | H04L 5/0044 |

* cited by examiner

RECEIVING APPARATUS AND CONTROL METHOD THEREOF

CROSS-REFERENCE TO THE RELATED APPLICATIONS

This application claims priority from Korean Patent Application No. 10-2016-0008216, filed on Jan. 22, 2016, in the Korean Intellectual Property Office, the disclosure of which is incorporated herein by reference in its entirety.

BACKGROUND

1. Field

Apparatuses and methods consistent with the exemplary embodiments relate to a receiving apparatus and a control method thereof, and more particularly, to a receiving apparatus which processes a bootstrap and a control method thereof.

2. Description of the Related Art

In the information-oriented society of the 21st century, broadcasting communication services are entering an era of digitization, multi-channel, broadband, and high quality. In particular, as high-quality digital television (TV), portable multimedia players (PMP), and portable broadcasting apparatuses have been increasingly used in recent years, even in digital broadcasting services, a demand for supporting various receiving methods has been increased.

In an actual state in which the standard group has established various standards according to demands to provide various services to satisfy user's needs, it is required to find methods for providing better services having improved performance.

SUMMARY

The exemplary embodiments of the inventive concept overcome the above disadvantages and other disadvantages not described above. However, the exemplary embodiments are not required to overcome the disadvantages described above, and may not overcome any of the problems described above.

The exemplary embodiments provide a receiving apparatus which improves complexity of hardware necessary for processing a bootstrap, and a control method thereof.

According to an exemplary embodiment, there is provided a receiving apparatus which may include: a receiver configured to receive an input signal including a transmission frame which includes a bootstrap, a preamble, and a payload; a bootstrap detector configured to detect the bootstrap based on a correlation between the input signal and a reference signal which is pre-stored; and a signal processor configured to signal-process the preamble based on the detected bootstrap and signal-process the payload based on the signal-processed preamble, and the bootstrap detector is configured to determine the correlation by quantizing at least one of the input signal and the reference signal and then multiplexing the input signal and the reference signal at least one of which is quantized.

The bootstrap detector may be configured to quantize by dividing at least one of the input signal and the reference signal into a plurality of levels and assigning different values to the divided levels.

The bootstrap detector may be configured to quantize by dividing at least one of the input signal and the reference signal into three levels and assigning values of −1, 0, and 1 to the divided levels.

The bootstrap detector may be configured to quantize by dividing at least one of the input signal and the reference signal into five levels and assigning values of −2, −1, 0, 1, and 2 to the divided levels.

The bootstrap detector may be configured to quantize the input signal and determine a correlation between the quantized input signal and the reference signal as the correlation between the input signal and the reference signal, or quantize the reference signal and determine a correlation between the quantized reference signal and the input signal as the correlation between the input signal and the reference signal.

The bootstrap detector may be configured to quantize the input signal and the reference signal, and determine a correlation between the quantized input signal and the quantized reference signal as the correlation between the input signal and the reference signal.

The bootstrap detector may be configured to quantize the input signal and determine a correlation between the quantized input signal and the reference signal, quantize the reference signal and determine a correlation between the quantized reference signal and the input signal, and determine the correlation between the input signal and the reference signal by superposing the correlation between the quantized input signal and the reference signal and the correlation between the quantized reference signal and the input signal.

The bootstrap detector may be configured to determine the correlation between the input signal and the reference signal by dividing each of the input signal and the reference signal into a plurality of samples, and performing the multiplexing on a sample basis.

In response to at least one of the input signal and the reference signal being divided into three levels and quantized, the sample of the quantized signal may have a size of two bits, and, in response to at least one of the input signal and the reference signal being divided into five levels and quantized, the sample of the quantized signal may have a size of three bits.

The receiving apparatus may further include: a first buffer configured to store first information on the input signal on the sample basis; and a second buffer configured to store second information on the reference signal on the sample basis. At least one of the first information and the second information may include information on the quantized input signal or the quantized reference signal.

According to an exemplary embodiment, there is provided a control method of a receiving apparatus. The method may include: receiving an input signal including a transmission frame which includes a bootstrap, a preamble, and a payload; detecting the bootstrap based on a correlation between the input signal and a reference signal which is pre-stored; and signal-processing the preamble based on the detected bootstrap and signal-processing the payload based on the signal-processed preamble, and wherein the detecting the bootstrap comprises determining the correlation by quantizing at least one of the input signal and the reference signal and then multiplexing the input signal and the reference signal at least one of which is quantized.

The detecting the bootstrap may include quantizing by dividing at least one of the input signal and the reference signal into a plurality of levels and assigning different values to the divided levels.

The detecting the bootstrap may include quantizing by dividing at least one of the input signal and the reference signal into three levels and assigning values of −1, 0, and 1 to the divided levels.

The detecting the bootstrap may include quantizing by dividing at least one of the input signal and the reference signal into five levels and assigning values of −2, −1, 0, 1, and 2 to the divided levels.

The detecting the bootstrap may include quantizing the input signal and determining a correlation between the quantized input signal and the reference signal as the correlation between the input signal and the reference signal, or quantizing the reference signal and determining a correlation between the quantized reference signal and the input signal as the correlation between the input signal and the reference signal.

The detecting the bootstrap comprises quantizing the input signal and the reference signal, and determining a correlation between the quantized input signal and the quantized reference signal as the correlation between the input signal and the reference signal.

The detecting the bootstrap may include: quantizing the input signal and determining a correlation between the quantized input signal and the reference signal; quantizing the reference signal and determining a correlation between the quantized reference signal and the input signal; and determining the correlation between the input signal and the reference signal by superposing the correlation between the quantized input signal and the reference signal and the correlation between the quantized reference signal and the input signal.

The detecting the bootstrap may include determining the correlation between the input signal and the reference signal by dividing each of the input signal and the reference signal into a plurality of samples, and performing the multiplexing on a sample basis.

In response to at least one of the input signal and the reference signal being divided into three levels and quantized, the sample of the quantized signal may have a size of two bits, and, in response to at least one of the input signal and the reference signal being divided into five levels and quantized, the sample of the quantized signal may have a size of three bits.

The control method may further include: storing first information on the input signal in a first buffer on the sample basis; and storing second information on the reference signal in a second buffer on the sample basis. At least one of the first information and the second information may include information on the quantized input signal or the quantized reference signal.

According to various exemplary embodiments as described above, an area occupied by hardware and cost can be reduced and also loss of performance can be minimized.

Additional and/or other aspects and advantages of the exemplary embodiments will be set forth in part in the description which follows and, in part, will be obvious from the description, or may be learned by practice of the disclosure.

BRIEF DESCRIPTION OF THE DRAWING FIGURES

The above and/or other aspects of the exemplary embodiments will be more apparent with reference to the accompanying drawings, in which.

DETAILED DESCRIPTION OF THE EXEMPLARY EMBODIMENTS

Hereinafter, various exemplary embodiments of the inventive concept will be described in detail with reference to the accompanying drawings. Further, in the following description, a detailed explanation of known related functions or configurations may be omitted to avoid unnecessarily obscuring the subject matter. In addition, terms to be described below may vary according to a user's and an operator's intentions, the convention, or the like as terms defined by considering functions. Therefore, the definition should be made according to the contents throughout this specification.

An apparatus and a method proposed in the exemplary embodiments can be, of course, applied to various communication systems including mobile broadcasting services including a digital multimedia broadcasting (DMB) service, digital video broadcasting handheld (DVB-H), an advanced television systems committee mobile/handheld (ATSC-M/H) service, an Internet protocol television (IPTV), and the like, communication systems including a moving picture experts group (MPEG) media transport (MMT) system, an evolved packet system (EPS), a long-terms evolution (LTE) mobile communication system, a long-term evolution-advanced (LTE-A) mobile communication system, a high speed downlink packet access (HDSPA) mobile communication system, a high speed uplink packet access (HSUPA) mobile communication system, a 3rd generation project partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, an Institute of Electrical and Electronics Engineers (IEEE) 802.16m communication system, a mobile Internet protocol (Mobile IP) system, and the like.

Figure 1:
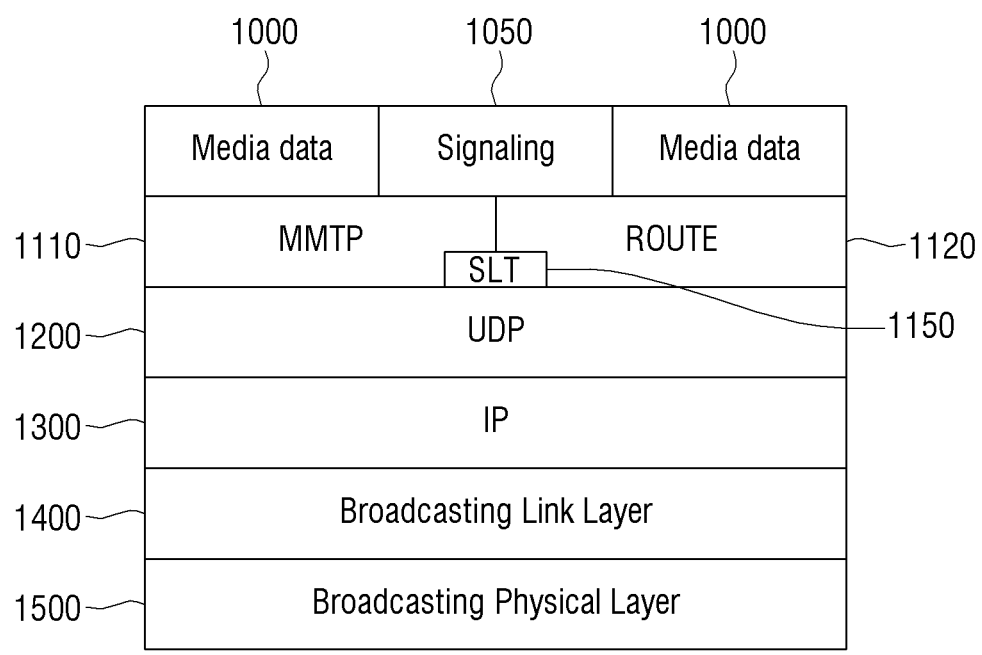
FIG. 1 is a diagram illustrating a hierarchical structure of a transmitting system, according to an exemplary embodiment.

FIG. 1 is a diagram illustrating a hierarchical structure of a transmitting system, according to an exemplary embodiment.

Referring to FIG. 1, a service includes media data 1000 and signaling 1050 for transferring information required to acquire and consume the media data at a receiver. The media data may be encapsulated in a format suitable for transmission prior to the transmission. An encapsulation method may follow a Media Processor (MPU) defined in ISO/IEC 23008-1 MPEG Media Transport (MMT) or a DASH segment format defined in ISO/IEC 23009-1 Dynamic Adaptive Streaming over HTTP (DASH). The media data 1000 and the signaling 1050 are packetized according to an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information about an application layer protocol, by which a service is transmitted, by an independent method different from the application layer protocol is required for the receiver to know by which application layer protocol the service is transmitted.

A service list table (SLT) 1150 illustrated in FIG. 1 represents or indicates a signaling method and packetizes information about the service in a table for satisfying the aforementioned object. Detailed contents of the SLT will be described below. The packetized media data and the signaling including the SLT are transferred to a broadcasting link layer 1400 through a user datagram protocol (UDP) 1200 and an Internet protocol (IP) 1300. An example of the broadcasting link layer 1400 includes an ATSC 3.0 link-layer protocol (ALP) defined in the ATSC 3.0 standard (hereafter, referred to as 'ATSC 3.0'). The ALP protocol generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG-transport stream (TS) packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio signal, and transmits the radio signal. In this case, the broadcasting physical layer 1500 has at least one signal processing path. An example of the signal processing path may include a physical layer pipe (PLP) of ATSC 3.0 or the Digital Video Broadcasting—Second Generation Terrestrial (DVB-T2) standard, and one or more services or some of the services may be mapped to the PLP. Herein, the PLP indicates a signal path which is processed independently. In other words, services (for example, video, extended video, audio, data stream, etc.) may be transmitted and received through a plurality of Radio Frequency (RF) channels, and the PLP refers to a path where these services are transmitted or received, or a stream which is transmitted through the path. The PLP may be located at slots which are distributed at time intervals on a plurality of RF channels, or may be distributed at time intervals on one RF channel. In other words, a single PLP may be distributed and transmitted with time intervals on one or a plurality of RF channels FIG. 2 is a diagram illustrating a schematic configuration of the broadcasting link layer 1400, according to an exemplary embodiment.

Figure 2:
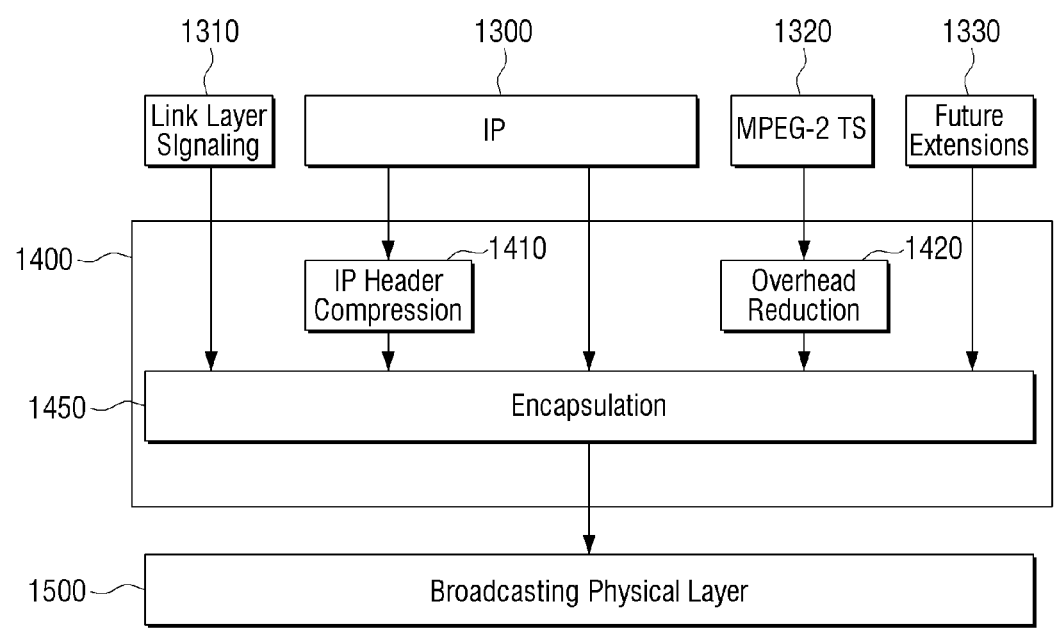
FIG. 2 is a diagram to illustrate a schematic configuration of a broadcasting link layer 1400, according to an exemplary embodiment.

Referring to FIG. 2, the input of the broadcasting link layer 1400 includes the IP packet 1300, and may further include link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410 and the MPEG2-TS packet may be subjected to an overhead reduction process 1420. During the ALP packetization, input packets may be subjected to dividing and merging processes.

Figure 3A:
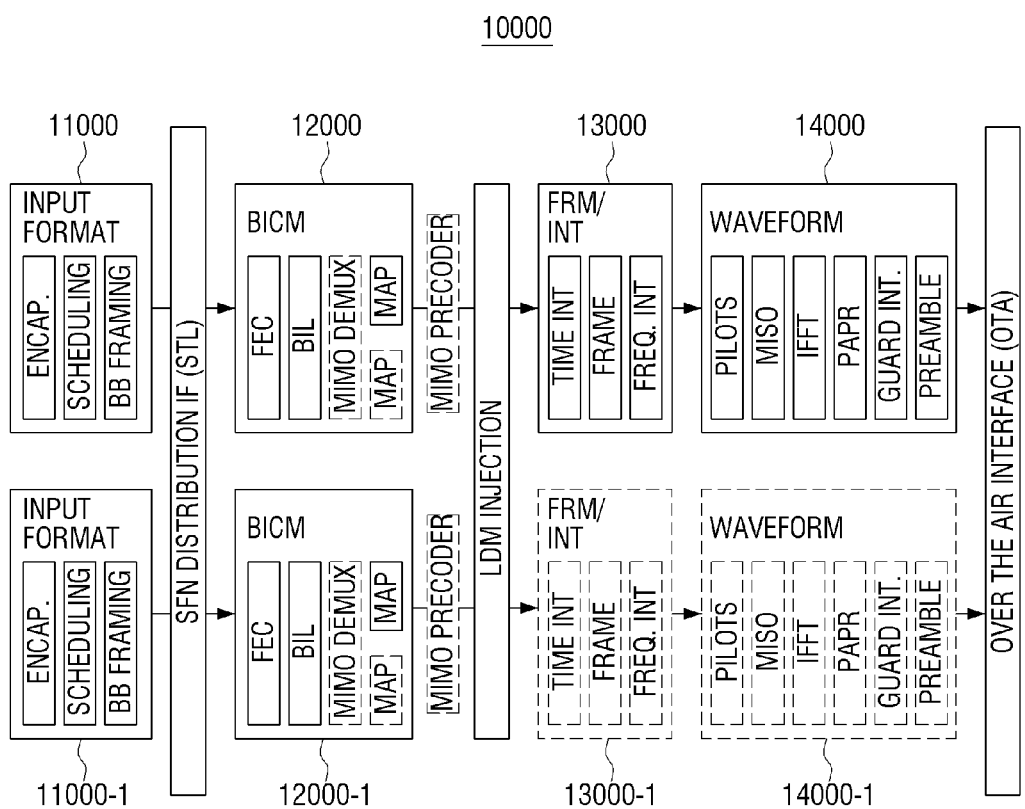
FIG. 3A is a diagram to illustrate a schematic configuration of a transmitting system (or a transmitting apparatus), according to an exemplary embodiment.

FIG. 3A is a diagram illustrating a schematic configuration of a transmitting system or a transmitting apparatus, according to an exemplary embodiment. According to FIG. 3A, a transmitting system 10000 according to the exemplary embodiment may include input formatting blocks 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream of data to be serviced. Herein, the input stream may be a transport stream (TS), Internet packets (IP) (e.g., IPv4 and IPv6), an MPEG media transport (MMT), a generic stream (GS), generic stream encapsulation (GSE), and the like. For example, an ATSC 3.0 link-layer protocol (ALP) packet may be generated based on the input stream, and the baseband packet may be generated based on the generated ALP packet.

The bit interleaved and coded modulation (BICM) blocks 12000 and 12000-1 determine an forward error correction (FEC) coding rate and a constellation order according to an area (fixed PHY frame or mobile PHY frame) through which the data to be serviced will be transmitted, and perform encoding and time interleaving. Meanwhile, signaling information about the data to be serviced may be encoded through a separate BICM encoder according to a system design or encoded by sharing a BICM encoder with the data to be serviced.

The framing/interleaving blocks 13000 and 13000-1 combine the time-interleaved data with a signaling signal including the signaling information to generate a transmission frame.

The waveform generation blocks 14000 and 14000-1 generate an Orthogonal Frequency-Division Multiplexing (OFDM) signal in a time domain from the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Herein, the blocks marked with the solid line are normal blocks, and the blocks marked with the dotted lines are blocks which may be used when informative multiple-input multiple-output (MIMO) is implemented.

Figure 3B:
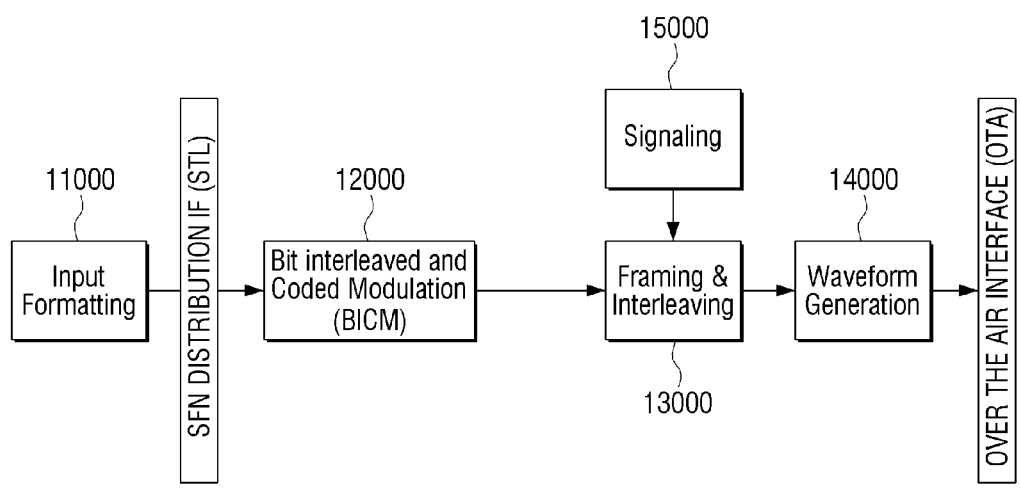
FIGS. 3B and 3C are diagrams to illustrate a multiplexing method, according to exemplary embodiments.
Figure 3C:
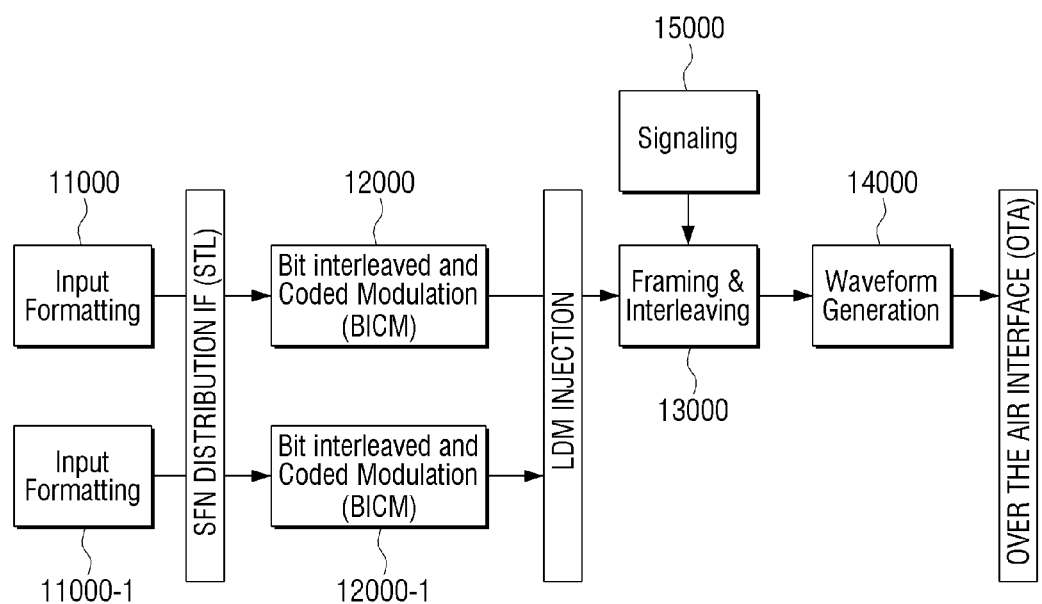

FIGS. 3B and 3C are diagrams illustrating a multiplexing method, according to exemplary embodiments.

FIG. 3B illustrates a block diagram for implementing time division multiplexing (TDM), according to an exemplary embodiment.

A TDM system architecture includes four main blocks (alternatively, parts) of the input formatting block 11000, the BICM block 12000, the framing/interleaving block 13000, and the waveform generation block 14000.

Data is input and formatted in the input formatting block 11000 and forward error correction is applied to the data in the BICM block 12000. Next, the data is mapped to a constellation. Subsequently, the data is time and frequency-interleaved in the framing/interleaving block 13000 and a frame is generated. Thereafter, an output waveform is generated in the waveform generation block 14000.

FIG. 3C illustrates a block diagram for implementing layered division multiplexing (LDM), according to an exemplary embodiment.

An LDM system architecture includes several other blocks as compared with the TDM system architecture. In detail, two separated input formatting blocks 11000 and 11000-1 and the BICM blocks 12000 and 12000-1 for one of respective layers of the LDM are included in the LDM system architecture. The blocks are combined in an LDM injection block before the framing/interleaving block 13000. And, the waveform generation block 14000 is similar to the TDM.

Figure 4:
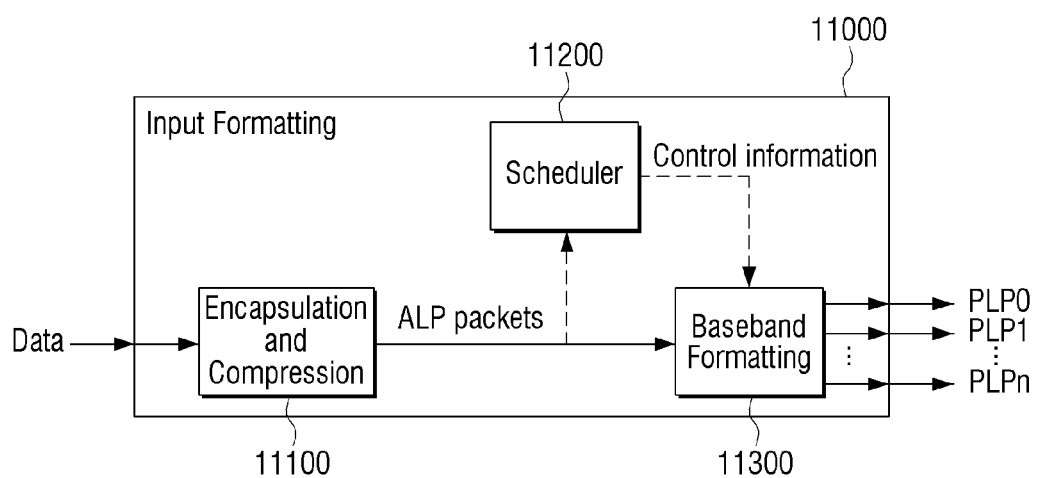
FIG. 4 is a block diagram showing a detailed configuration of an input formatting block shown in FIG. 3A, according to an exemplary embodiment.

FIG. 4 is a block diagram illustrating a detailed configuration of the input formatting block 11000 illustrated in FIG. 3A, according to an exemplary embodiment.

As illustrated in FIG. 4, the input formatting block 11000 includes three blocks that control packets distributed to PLPs. In detail, the input formatting block 11000 includes an encapsulation and compression block 11100, a baseband formatting block (alternatively, baseband framing block) 11300, and a scheduler block 11200.

An input stream input to the encapsulation and compression block 11100 may be various types. For example, the input stream may be a transport stream (TS), an Internet packets (IP) (e.g., IPv4 and IPv6), an MPEG media transport (MMT), a generic stream (GS), a generic stream encapsulation (GSE), and the like.

Packets output from the encapsulation and compression block 11100 become ALP packets (generic packets) (also referred to as L2 packets). Herein, a format of an ALP packet may be one of the Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet is 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

Meanwhile, an operation of the scheduler block 11200 is constrained to a set of dynamic, quasi-static, and static components. Definition of the constraint may vary according to user implementation.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
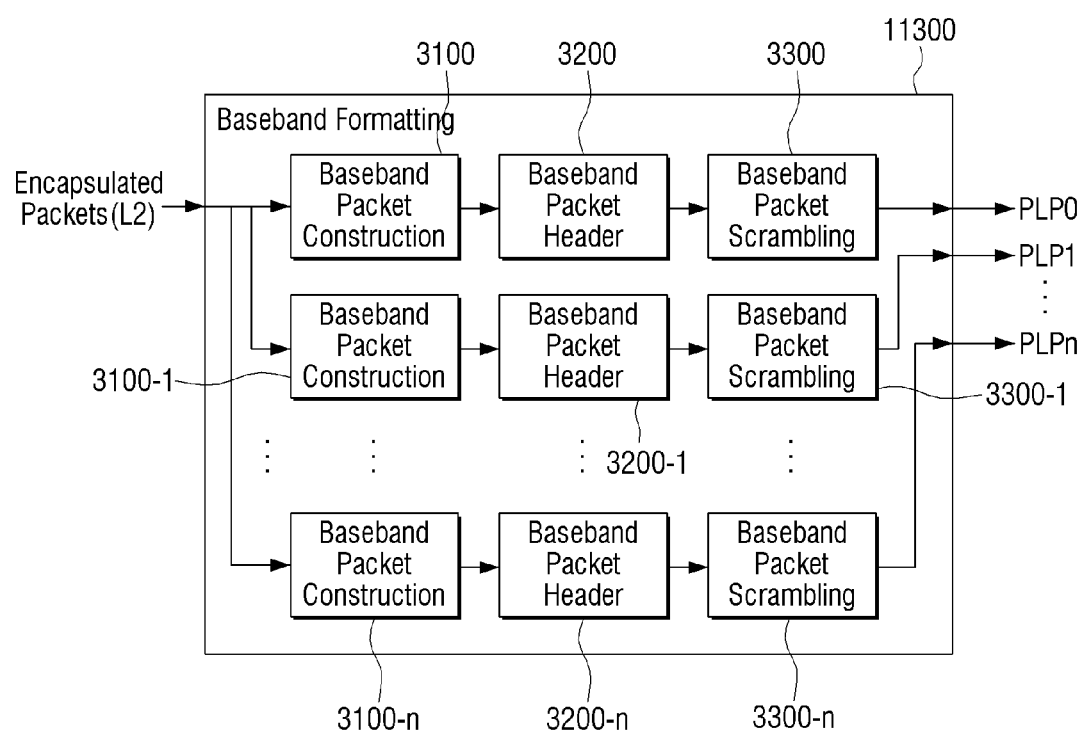
FIGS. 5A and 5B are diagrams to illustrate a detailed configuration of a baseband framing block, according to exemplary embodiments.

The baseband formatting block 11300 includes baseband packet construction blocks 3100, 3100-1, . . . 3100-n, baseband packet header construction blocks 3200, 3200-1, . . . , 3200-n, and baseband packet scrambling blocks 3300, 3300-1, . . . , 3300-n, as illustrated in FIG. 5A. In an M-PLP operation, the baseband formatting block generates a plurality of PLPs as necessary.

Figure 5B:
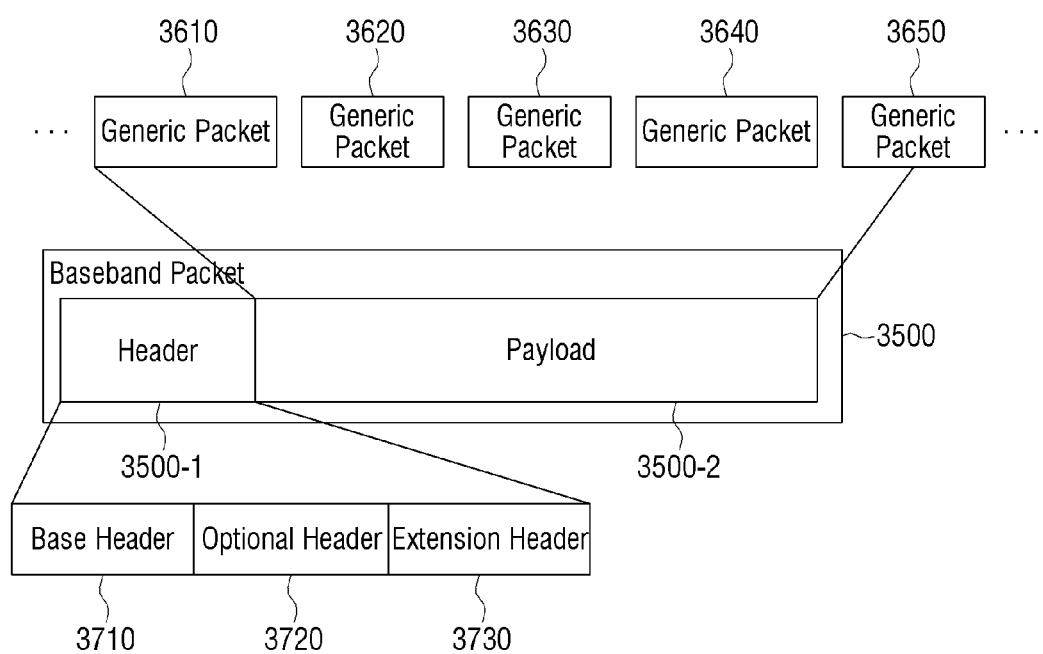

The baseband packet construction blocks 3100, 3100-1, . . . , 3100-n construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500, these packets are distributed between a current baseband packet and a next baseband packet. The ALP packets are distributed in a unit of a byte.

The baseband packet header construction blocks 3200, 3200-1, . . . , 3200-n construct a header 3500-1. The header 3500-1 includes three parts, that is, a base field (also referred to as, a base header) 3710, an optional field (also referred to as, an option header) 3720, and an extension field (also referred to as, an extension header) 3730, as illustrated in FIG. 5B. Herein, the base field 3710 is shown in every baseband packet and the optional field 3720 and the extension field 3730 may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and for example, used for a baseband packet counter, baseband packet time stamping, additional signaling, and the like.

The baseband packet scrambling blocks 3300, 3300-1, . . . , 3000-n scramble the baseband packet.

Figure 6:
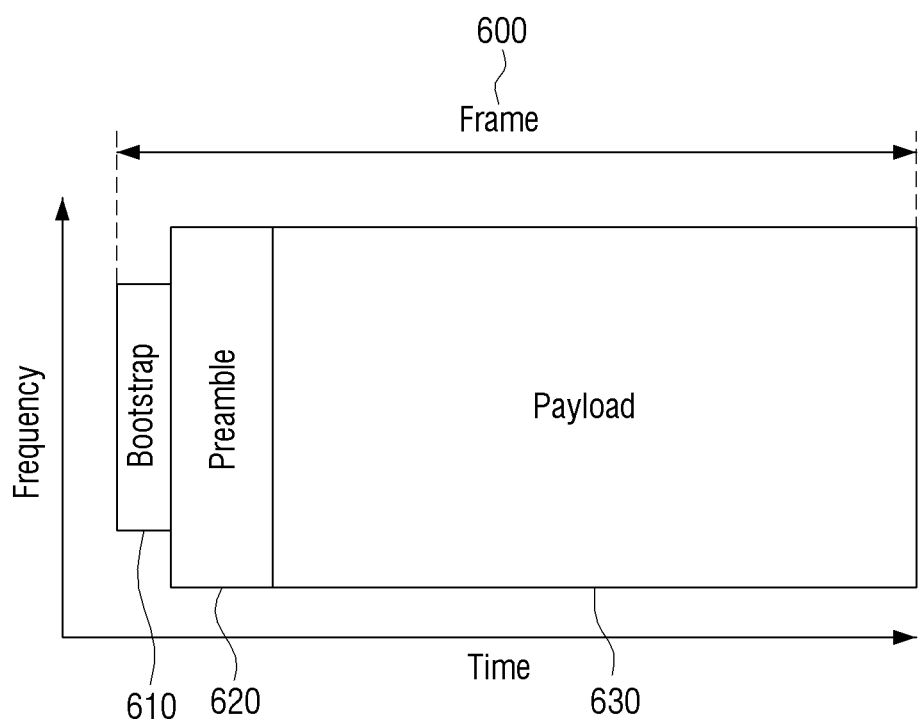
FIG. 6 is a diagram to illustrate a bootstrap which is processed in a receiving apparatus, according to an exemplary embodiment.

FIG. 6 is a diagram to illustrate a bootstrap which is processed in a receiving apparatus, according to an exemplary embodiment.

Referring to FIG. 6, a frame 600 may be represented by a combination of three basic configurations. Specifically, the frame 600 may include a bootstrap 610 which is located at a start portion of each frame, a preamble 620 which is located next to the bootstrap 610, and a payload 630 which is located next to the preamble 620.

Herein, the preamble 620 includes L1 control signaling to be used for processing data included in the payload 630.

In addition, the payload 630 includes at least one sub frame. When a plurality of sub frames exist in the payload 630, the plurality of sub frames are all connected with one another and arranged with reference to a time axis shown in FIG. 6.

Each of the sub frames has an FFT size, a GI length, a distributed pilot pattern, and an effective number of carriers. The FFT size, the GI length, the distributed pilot pattern, and the effective number of carriers are not changed in the same sub frame. However, the FFT size, the GI length, the distributed pilot pattern, and the effective number of carriers may be different between the different sub frames in the frame 600.

Figure 8A:
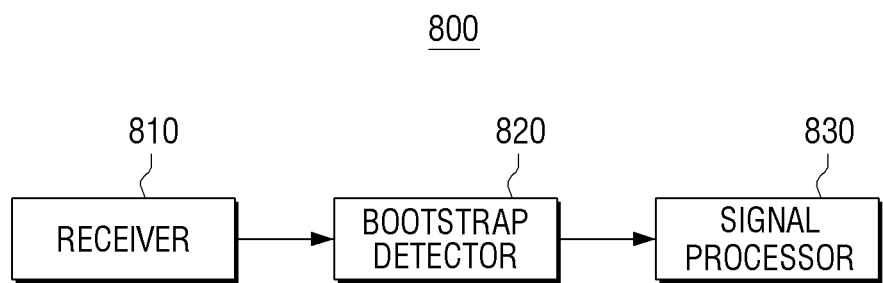
FIG. 8A is a block diagram showing a configuration of a receiving apparatus, according to an exemplary embodiment.

In particular, the bootstrap 610 may include a synchronization symbol located at the start portion of each frame for a receiving apparatus as shown in FIG. 8A to detect a signal, minutely synchronize, estimate a frequency offset, and estimate an initial channel.

In addition, the bootstrap 610 may include control signaling necessary for the receiving apparatus to receive and decode the preamble 620 and the payload 630 of the frame 600 except the bootstrap 610.

Specifically, the bootstrap 610 uses a fixed sampling rate of 6.144 Ms/sec and a fixed bandwidth of 4.5 Mhz regardless of a channel bandwidth used in the other parts except the bootstrap 610.

Figure 7:
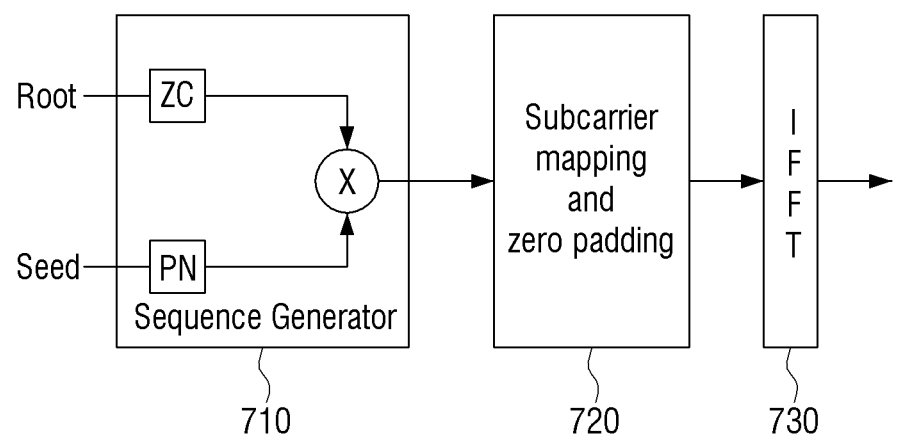
FIG. 7 is a diagram to illustrate a process of generating a bootstrap in a frequency domain, according to an exemplary embodiment.

FIG. 7 is a diagram to illustrate a process of generating a bootstrap in a frequency domain, according to an exemplary embodiment.

Referring to FIG. 7, a sequence generator 710 may perform modulation with respect to a zadoff chu (ZC) sequence using a pseudo-noise (PN) sequence. Herein, a ZC root and a PN seed may be signaled as a positive (+) value and a negative (−) value of the bootstrap, respectively.

Accordingly, values used for each bootstrap symbol originate from the ZC sequence modulated by the PN sequence.

In addition, a complex sequence generated in the sequence generator 710 may be mapped onto a subcarrier through a subcarrier mapping and zero padding unit 720, and the complex sequence mapped onto the subcarrier is inverse-Fourier-transformed through an Inverse Fast Fourier Transform (IFFT) unit 730. Through this process, the bootstrap is generated.

FIG. 8A is a diagram showing a configuration of a receiving apparatus, according to an exemplary embodiment.

Referring to FIG. 8A, the receiving apparatus 800 includes a receiver 810, a bootstrap detector 820, and a signal processor 830.

The receiver 810 may receive an input signal including a transmission frame including a bootstrap, a preamble, and a payload. Herein, the bootstrap, the preamble, and the payload have been described in FIG. 6, and thus a detailed description thereof is omitted.

Specifically, the receiver 810 may receive signaling information and a frame which includes data mapped onto at least one signal processing path. Herein, the signaling information may include information on an input type of an input stream input to a transmitting apparatus (not shown) and information on a type of data mapped onto the at least one signal processing path. Herein, the information on the input type of the input stream may indicate whether all of the signal processing paths in the frame are of the same input type or not.

Herein, the signaling information may be a Layer 1 (L1) signaling signal to transmit an L1 signal for frame synchronization, and the preamble in which L1 signaling information is inserted may include an L1 pre-signaling area and an L1 post-signaling area. In addition, the L1 post-signaling area includes a configurable field and a dynamic field.

The L1 pre-signaling area may include information for interpreting L1 post-signaling and information on an entire system (e.g., a transmitting and/or receiving apparatus), and may be implemented to always have the same length. In addition, the L1 post-signaling area may include information on each PLP and information on the system, and the L1 signaling area included in each frame in a single super frame may have the same length but include different contents.

The bootstrap detector 820 may detect a bootstrap based on a correlation between an input signal and a pre-stored reference signal. Specifically, the bootstrap detector 820 may determine the correlation between the input signal and the pre-stored reference signal by determining whether the input signal and the pre-stored reference signal are consistent with each other. In addition, the bootstrap detector 820 may detect the bootstrap by measuring a start point of the bootstrap based on the determined correlation.

In addition, the signal processor 830 may process the preamble symbol based on the detected bootstrap and signal-process the payload based on the signal-processed preamble. The signal processing will be explained in detail below.

Figure 8B:
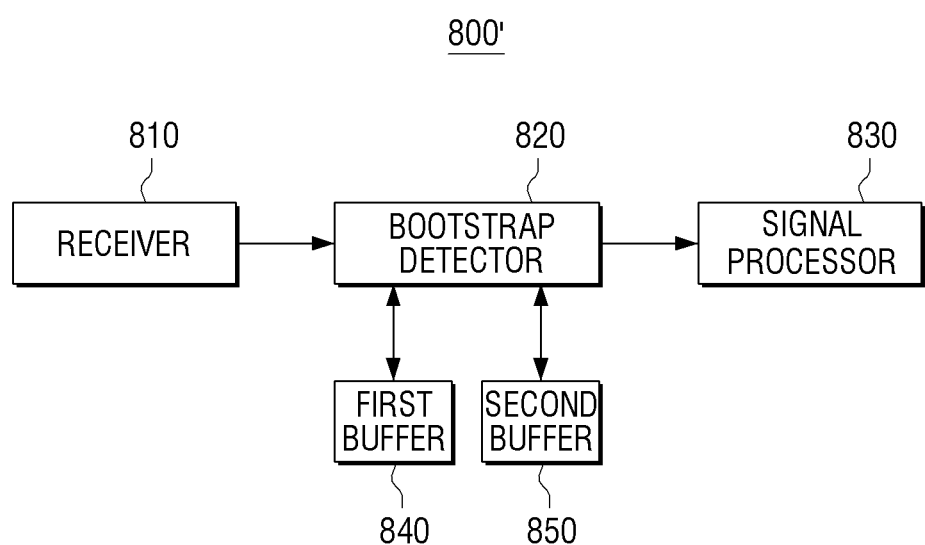
FIG. 8B is a block diagram showing a configuration of a receiving apparatus, according to another exemplary embodiment.

FIG. 8B is a block diagram showing a configuration of a receiving apparatus, according to another exemplary embodiment.

Referring to FIG. 8B, the receiving apparatus 800' may include a receiver 810, a bootstrap detector 820, a signal processor 830, a first buffer 840, and a second buffer 850. Specifically, the first buffer 840 may store information on an input signal on a sample basis, and the second buffer 850 may store information on a reference signal on a sample basis. This will be explained in detail below. However, according to an exemplary embodiment, one single buffer may be used to store both the information on the input signal and the information on the reference signal on a sample basis.

The bootstrap detector 820 may determine a correlation between the input signal and the pre-stored reference signal by quantizing at least one of the input signal and the pre-stored reference signal and then multiplexing.

Regarding this, a related-art bootstrap detection method will be explained first.

Figure 9:
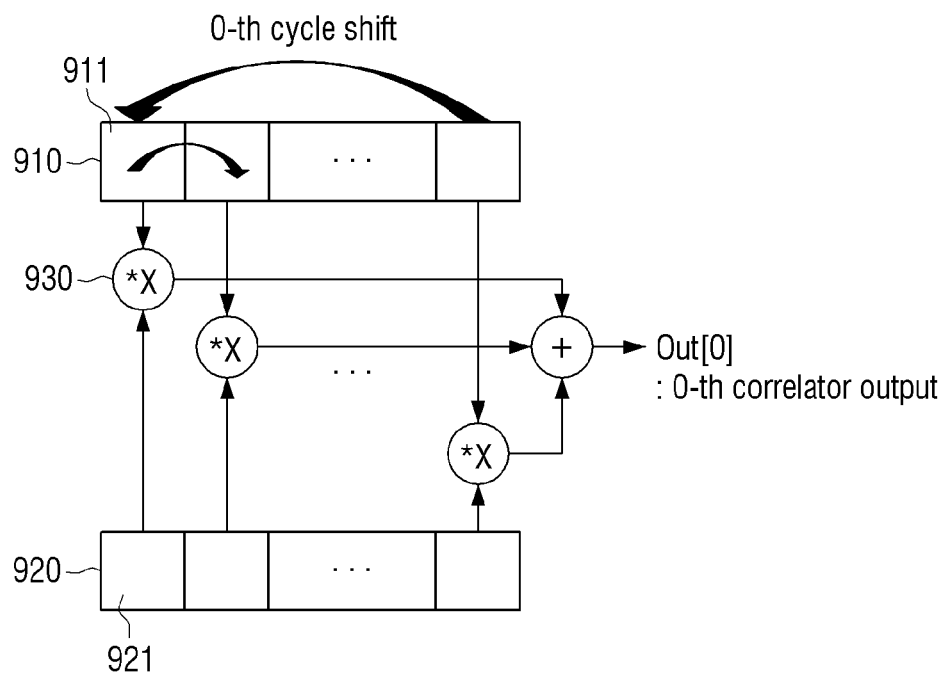
FIG. 9 is a diagram to illustrate a related-art bootstrap detection process.
Figure 9:
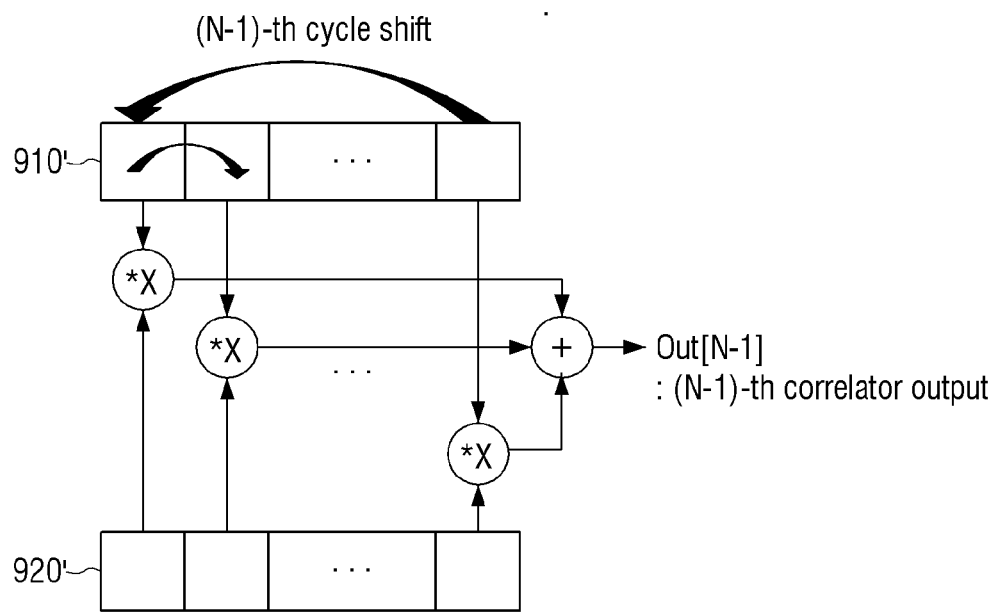

FIG. 9 is a diagram to illustrate a related-art bootstrap detection process.

Referring to FIG. 9, in the related-art bootstrap detection method, a correlation is determined between an input signal 910 and a pre-stored reference signal 920 on a sample basis. That is, the related-art method determines a correlation between a first sample 911 of the input signal 910 and a first sample 921 of the pre-stored reference signal 920, and determines a correlation between the next sample of the input signal 910 and the next sample of the pre-stored reference signal 920 in sequence.

In determining the correlation on the sample basis, a window of a predetermined size is required to process on the sample basis. Through this window, the correlation between the input signal 910 and the pre-stored reference signal 920 is calculated on the sample basis.

In addition, a multiplier is used to determine the correlation. Further, information on the input signal 910 and the pre-stored reference signal 920 may be stored in a buffer on the sample basis.

For example, it is assumed that N is a length of a window used for determining the correlation, and L is a sample unit length of the input signal 910 and the pre-stored reference signal 920. In this case, the buffer for storing the information on the input signal 910 on the sample basis requires a size of L*N which is the length of the window N multiplied by the sample unit length L of the input signal 910. Likewise, the buffer for storing the information on the pre-stored reference signal 920 on the sample basis requires a size of L*N which is the length of the window L multiplied by the sample unit length L of the pre-stored reference signal 920. Accordingly, the buffer for storing the information on the input signal 910 and the pre-stored reference signal 920 on the sample basis has the size of 2*L*N.

The bootstrap mathematically includes a real number part and an imaginary number part. Since the correlation is determined for the real number part and the imaginary number part of the bootstrap, the correlation between the input signal 910 and the pre-stored reference signal 920 is determined in relation to the real number part of the bootstrap, and in relation to the imaginary number part of the bootstrap. As a result, the total size of the buffer for storing the information on the input signal 910 and the pre-stored reference signal 920 on the sample basis is two times the size of 2*L*N described above considering the real number part and the imaginary number part of the bootstrap.

Accordingly, the size of the buffer necessary in the related-art bootstrap detection process is 4*L*N, and the size of the buffer is 4*L*N bit long considering that the length unit of the input signal is a bit.

The number of multipliers necessary for determining the correlation is N which corresponds to the length of the window. When the complex number corresponding to the input signal 910 and the complex number corresponding to the pre-stored reference signal 920 are calculated to determine the correlation, multiplication is performed four times in total. Accordingly, the total number of necessary multipliers is 4*N.

The number of adders necessary for determining the correlation is log 2(N).

As described above, the related-art bootstrap detection process requires the buffer of the size of 4*L*N bits, the 4*N number of multipliers, and the log 2(N) number of adders.

Compared with the related-art method, a bootstrap detection process according to an exemplary embodiment will be explained.

Specifically, according to an exemplary embodiment, the bootstrap detector 820 may determine the correlation by quantizing at least one of the input signal and the pre-stored reference signal and then multiplexing.

Figure 10:
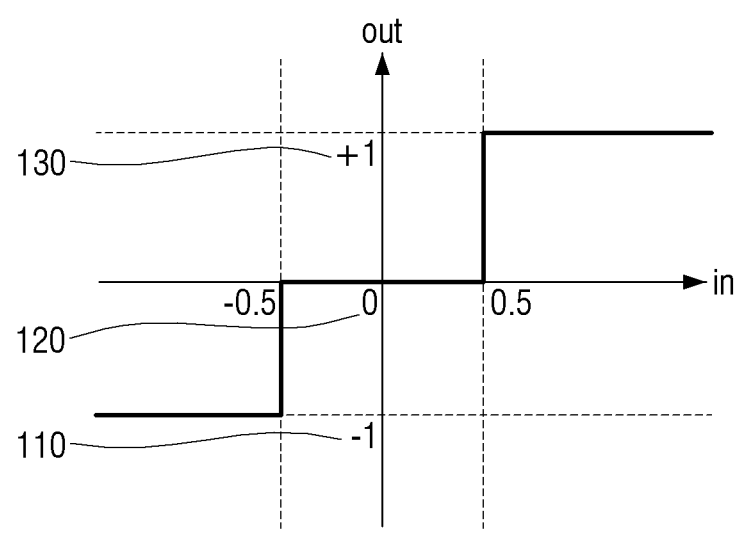
FIG. 10 is a graph to illustrate quantization, according to an exemplary embodiment.

FIG. 10 is a graph to illustrate quantization. Referring to FIG. 10, the horizontal axis shows a value of an input signal and the vertical axis shows a value which is output as a result of quantizing.

Specifically, in response to the value of the input signal being less than −0.5, −1 110 is output through the graph shown in FIG. 10. In response to the value of the input signal being −0.5 to 0.5 inclusive, 0 120 is output through the graph shown in FIG. 10. In response to the value of the input signal being greater than 0.5, +1 130 is output through the graph shown in FIG. 10.

That is, the input signal is quantized to values of −1, 0, and 1 through the graph shown in FIG. 10 and output.

Specifically, the bootstrap detector 820 may quantize by dividing at least one of the input signal and the pre-stored reference signal into a plurality of levels, and assigning different values to the divided levels.

That is, referring to FIG. 10, the bootstrap detector 820 may quantize by dividing at least one of the input signal and the pre-stored reference signal into three levels through the graph shown in FIG. 10, and assigning different values of −1, 0, and +1 to the divided levels.

Although the input signal is quantized to values of −1, 0, and 1 and output in FIG. 10, the input signal may be quantized to values of −2, −1, 0, 1, and 2 and output.

That is, the bootstrap detector 820 may quantize by dividing at least one of the input signal and the pre-stored reference signal into five levels, and assigning values of −2, −1, 0, 1, and 2 to the divided levels.

For example, the bootstrap detector 820 may quantize the input signal to −2, −1, 0, +1, and +2 in such a manner that −2 is output in response to the value of the input signal being less than −1, −1 is output in response to the value of the input signal being −1 to −0.5 inclusive, 0 is output in response to the value of the input signal −0.5 to 0.5 inclusive, +1 is output in response to the value of the input signal being 0.5 to +1 inclusive, and +2 is output in response to the value of the input signal being greater than +1.

The bootstrap detector 820 may quantize the input signal and determine a correlation between the quantized input signal and the reference signal as the correlation between the input signal and the reference signal, or may quantize the reference signal and determine a correlation between the quantized reference signal and the input signal as the correlation between the input signal and the reference signal. This will be explained in detail below with reference to FIG. 11.

Figure 11:
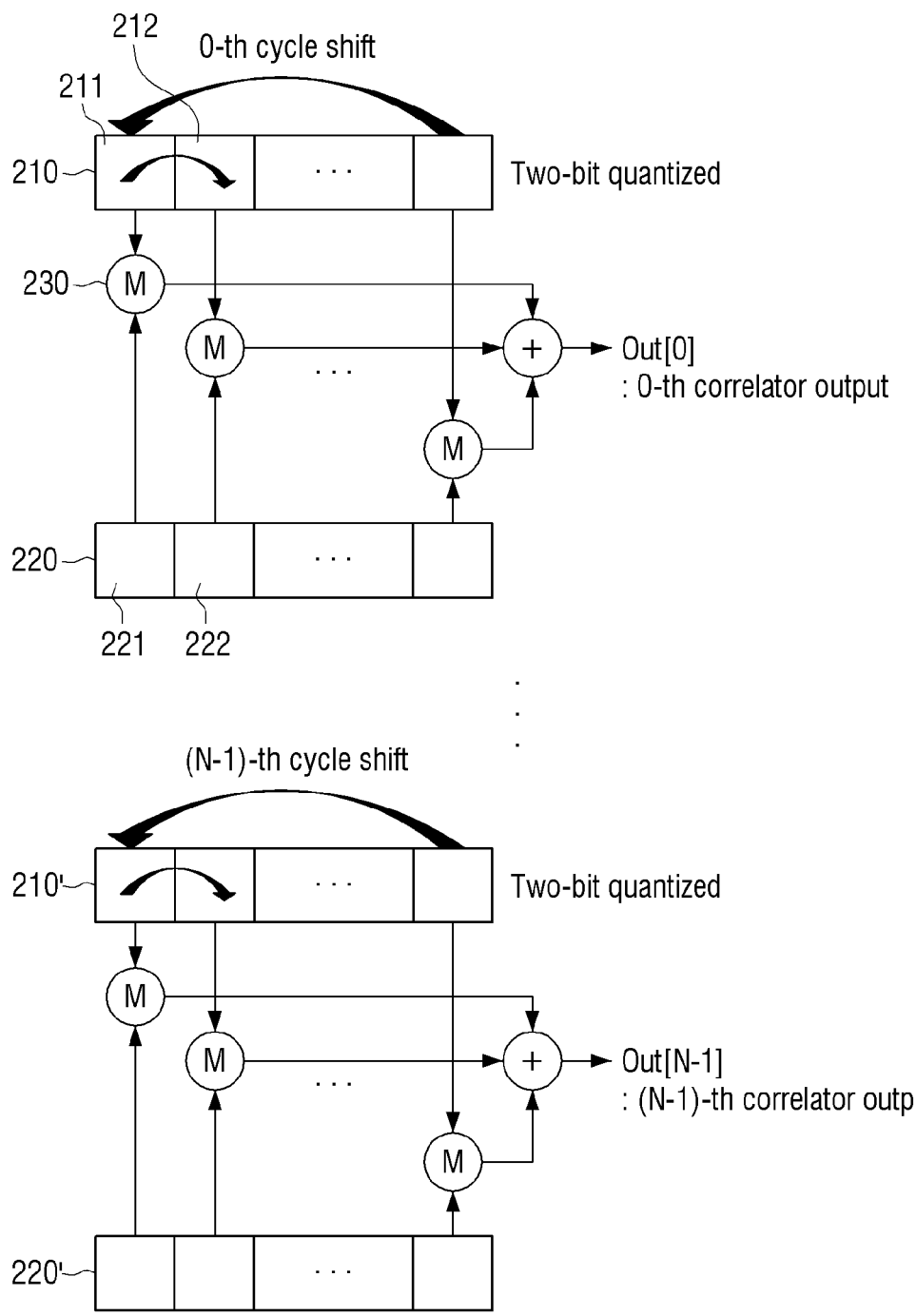
FIG. 11 is a diagram to illustrate a bootstrap detection process, according to an exemplary embodiment.

FIG. 11 is a diagram to illustrate a bootstrap detection process, according to an exemplary embodiment.

Referring to FIG. 11, the bootstrap detector 820 may divide each of an input signal 210 and a pre-stored reference signal 220 into a plurality of samples, and determine a correlation by multiplexing on a sample basis.

Specifically, the bootstrap detector 820 divides the input signal 210 into a plurality of samples, that is, a first sample 211, a second sample 212, . . . , and divides the pre-stored reference signal 220 into a plurality of samples, that is, a first sample 221, a second sample 222, . . . , and processes a correlation between the first sample 211 of the input signal 210 and the first sample 221 of the pre-stored reference signal 220, and processes a correlation between the second sample 212 of the input signal 210 and the second sample 222 of the pre-stored reference signal 220 in sequence, and finally processes a correlation between the last samples, that is, (N−1)-th samples of the input signal 210' and the pre-stored reference signal 220'.

In particular, the bootstrap detector 820 may quantize the input signal 210 and determine a correlation between the quantized input signal 210 and the reference signal 220. Herein, the bootstrap detector 820 may quantize the input signal 210 using the quantization method described in FIG. 10.

Specifically, the bootstrap detector 820 may quantize the input signal 210 by dividing the input signal 210 into three levels and assigning values of −1, 0, and 1 to the divided levels.

In addition, in response to the input signal being divided into three levels and quantized, the size of the sample of the quantized signal may be two bits.

Specifically, since the bootstrap detector 820 can quantize the input signal 210 in on the sample basis and the values of −1, 0, and 1 can be expressed by two bits, the size of each sample of the input signal 210 may be two bits.

That is, in response to the input signal 210 being quantized, each of the samples of the input signal 210 may have one of the values −1, 0, and 1, and accordingly, the size of each of the samples of the input signal 210 is two bits. Therefore, the quantizing the input signal 210 may be interpreted as making the size of each of the samples of the input signal 210 into two bits. Accordingly, the term "two-bit quantized" written on the right side of the input signal 210 in FIG. 11 is defined as having the same meaning as the quantizing the input signal 210.

In addition, in determining the correlation on the sample basis, the bootstrap detector 820 requires a window of a predetermined size to process on the sample basis. Through this window, the bootstrap detector 820 may calculate a correlation between the quantized input signal 210 and the pre-stored reference signal 220 on the sample basis.

In addition, unlike in the related-art bootstrap detection process which uses a multiplier to determine the correlation, a multiplexer 230 is used to determine the correlation in response to the input signal 210 being quantized.

For example, it is assumed that the first sample 211 of the input signal 210 is quantized to −1 and the second sample 212 of the input signal 210 is quantized to 1, and the first sample 221 of the pre-stored reference signal 220 has the value of 3 and the second sample 222 of the pre-stored reference signal 220 has the value of 2. In this case, the related-art bootstrap detection process multiplies "4" of the first sample 211 of the input signal 210 and "3" of the first sample 221 of the pre-stored reference signal 220 using the multiplier. On the other hand, the bootstrap detector 820 according to the exemplary embodiment may calculate "−3" by combining the sign "−" and "3" of the first sample 221 of the pre-stored reference signal using the multiplexer 230.

That is, the bootstrap detector 820 according to the exemplary embodiment quantizes the input signal 210 to one of the values −1, 0, and 1, and thus outputs a value by adding the sign "−" to the value of the pre-stored reference signal in response to "4", outputs "0" in response to "0", and outputs the value of the pre-stored reference signal as it is in response to "1." The multiplexer 230 rather than the multiplier may be enough to perform the above-described process.

Meanwhile, the information on the quantized input signal 210 and the pre-stored reference signal 220 may be stored in a buffer on the sample basis.

For example, it is assumed that N is a length of a window used for determining the correlation, the size of the sample unit is two bits since the input signal 210 is quantized, and L is a sample unit length of the pre-stored reference signal 220. In this case, the buffer for storing the information on the quantized input signal 210 on the sample basis requires a size of 2*N which is the length N of the window multiplied by the two bits of the sample unit size of the input signal 210, and the buffer for storing the information on the pre-stored reference signal 220 on the sample basis requires a size of L*N which is the length N of the window multiplied by the sample unit length L of the pre-stored reference signal 220. Accordingly, the buffer for storing the information on the quantized input signal 210 and the pre-stored reference signal 220 on the sample basis has the size of 2*N+L*N.

In addition, as described above, the bootstrap includes a real number part and an imaginary number part. Since the correlation is determined for the real number part and the imaginary number part of the bootstrap, the correlation between the quantized input signal 210 and the pre-stored reference signal 220 is determined in relation to the real number part of the bootstrap, and in relation to the imaginary number part of the bootstrap. As a result, the total size of the buffer for storing the information on the quantized input signal 210 and the pre-stored reference signal 220 on the sample basis is 2*2*N+2*L*N, which is two times the size of 2*N+L*N described above, that is, 4N+2LN, considering the real number part and the imaginary number part of the bootstrap.

Comparing the method of the exemplary embodiments and the related-art bootstrap detection process in relation to the size of the buffer, the size of the buffer necessary in the related-art bootstrap detection process is 4*L*N, whereas the size of the buffer required by the bootstrap detector 820 according to the exemplary embodiment is 4N+2LN. Therefore, the size of the buffer required by the bootstrap detector 820 according to the exemplary embodiment is relatively small unless the input signal is quantized and thus the size of each sample is two bits.

Meanwhile, as described above in FIG. 8B, the receiving apparatus 800 according to the exemplary embodiment includes the first buffer 840 and the second buffer 850. The first buffer 840 may store the information on the input signal on the sample basis, and the second buffer 850 may store the information on the pre-stored reference signal on the sample basis.

That is, in the above-described example, the buffer required by the bootstrap detector 820 according to the exemplary embodiment may include the first buffer 840 which has the size of 4N bits to store the information on the quantized input signal on the sample basis and the second buffer 850 which has the size of 2LN bits.

In addition, in determining the correlation, the bootstrap detector 820 according to the exemplary embodiment uses the multiplexer 230 rather than the multiplier, and, considering that the hardware area of the multiplier is larger than the hardware area of the multiplexer, the hardware area of the bootstrap detector 820 according to the exemplary embodiment is reduced in comparison to the hardware area necessary in the related-art bootstrap detection process.

Meanwhile, the number of adders required to determine the correlation, which is log 2(N), is the same as the number of adders used in the related-art bootstrap detection process.

In FIG. 11, the bootstrap detector 820 quantizes the input signal 210 by way of an example. However, the bootstrap detector 820 may quantize the reference signal 220 rather than the input signal 210 and determine a correlation between the quantized reference signal 220 and the input signal 210 as the correlation between the input signal and the reference signal.

Likewise, the process of quantizing the input signal 210 and determining the correlation between the input signal 210 and the reference signal 220, the size of the buffer, and the numbers of the multiplexers and adders described in FIG. 11 may be equally applied when the reference signal 220 is quantized and the correlation between the quantized reference signal 220 and the input signal 210 is determined.

That is, the bootstrap detector 820 may quantize one of the input signal 210 and the reference signal 220 and then determine the correlation by multiplexing.

In addition, in FIG. 11, the bootstrap detector 820 quantizes by dividing the input signal 210 into three levels and assigning the values of −1, 0, and 1 to the divided levels. However, the bootstrap detector 820 may quantize by dividing the input signal 210 into five levels and assigning the values of −2, −1, 0, 1, and 2 to the divided levels as described in FIG. 10.

In particular, in response to the input signal 210 being divided into three levels and quantized, the size of the sample of the quantized signal may be two bits, and, in response to the input signal 210 being divided into five levels and quantized, the size of the sample of the quantized signal may be three bits.

In addition, in response to the size of the sample of the quantized signal being three bits, the total size of the buffer required by the bootstrap detector 820 may be 6N+2LN. Specifically, the buffer required by the bootstrap detector 820 may include the first buffer 840 which has the size of 6N bits to store the information on the quantized input signal 210 on the sample basis, and the second buffer 850 which has the size of 2LN bits to store the information on the reference signal 220.

In addition, the process of quantizing the input signal 210 and determining the correlation between the quantized input signal 210 and the reference signal 220, and the numbers of multiplexers and adders may be equally applied when the input signal 210 is divided into five levels and quantized.

Meanwhile, the bootstrap detector 820 may quantize both the input signal and the reference signal and determine a correlation between the quantized input signal and the quantized reference signal.

Figure 12:
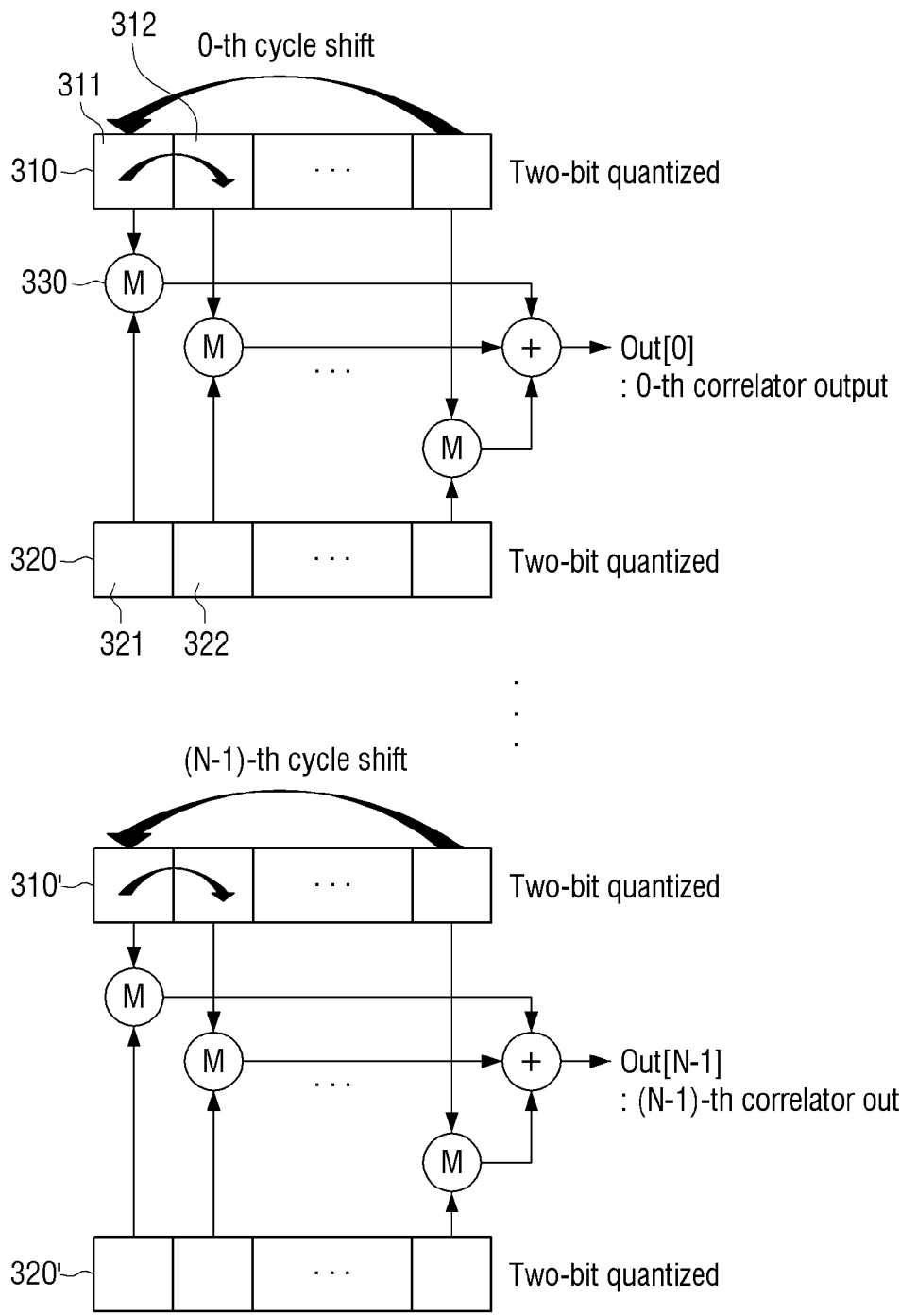
FIG. 12 is a diagram to illustrate a process of detecting a bootstrap, according to another exemplary embodiment.

FIG. 12 is a diagram to illustrate a bootstrap detection process, according to another exemplary embodiment.

Referring to FIG. 12, the bootstrap detector 820 may divide each of an input signal 310 and a pre-stored reference signal 320 into a plurality of samples, and determine a correlation by multiplexing on a sample basis.

Specifically, the bootstrap detector 820 divides the input signal 310 into a plurality of samples, that is, a first sample 311, a second sample 312, . . . , and divides the pre-stored reference signal 320 into a plurality of samples, that is, a first sample 321, a second sample 322, . . . , and processes a correlation between the first sample 311 of the input signal 310 and the first sample 321 of the pre-stored reference signal 320, and processes a correlation between the second sample 312 of the input signal 310 and the second sample 322 of the pre-stored reference signal 320 in sequence, and finally processes a correlation between the last samples, that is, (N−1)-th samples of the input signal 310' and the pre-stored reference signal 320'.

Herein, the bootstrap detector 820 may quantize both the input signal 310 and the pre-stored reference signal 320, and determine the correlation between the quantized input signal 310 and the quantized reference signal 320. Herein, the bootstrap detector 820 may quantize the input signal 310 and the pre-stored reference signal 320 using the quantization method described in FIG. 10.

Specifically, the bootstrap detector 820 may quantize the input signal 310 and the pre-stored reference signal 320 by dividing each of the input signal 310 and the pre-stored reference signal 320 into three levels and assigning values of −1, 0, and 1 to the divided levels.

In addition, in response to the input signal 310 and the pre-stored reference signal 320 being divided into three levels and quantized, the size of the sample of each of the quantized signals may be two bits.

Specifically, since the bootstrap detector 820 can quantize the input signal 310 and the pre-stored reference signal 320 in on the sample basis and the values of −1, 0, and 1 can be expressed by two bits, the size of each sample of the input signal 310 and the pre-stored reference signal 320 may be two bits.

That is, in response to the input signal 310 and the pre-stored reference signal 320 being quantized, each of the samples of the input signal 310 and the pre-stored reference signal 320 may have one of the values −1, 0, and 1, and accordingly, the size of each of the samples of the input signal 310 and the pre-stored reference signal 320 is two bits. Therefore, the quantizing the input signal 310 and the pre-stored reference signal 320 may be interpreted as making the size of each of the samples of the input signal 310 and the pre-stored reference signal 320 into two bits. Accordingly, the term "two-bit quantized" written on the right side of the input signal 310 and the pre-stored reference signal 320 in FIG. 12 is defined as having the same meaning as the quantizing the input signal 310 and the pre-stored reference signal 320.

In addition, in determining the correlation on the sample basis, the bootstrap detector 820 requires a window of a predetermined size to process on the sample basis. Through this window, the bootstrap detector 820 may calculate a correlation between the quantized input signal 310 and the quantized reference signal 320 on the sample basis.

In addition, unlike in the related-art bootstrap detection process which uses a multiplier to determine the correlation, a multiplexer 330 is used to determine the correlation in response to the input signal 310 and the pre-stored reference signal 320 being quantized.

For example, it is assumed that the first sample 311 of the input signal 310 is quantized to −1 and the second sample 312 of the input signal 310 is quantized to 1, and the first sample 321 of the pre-stored reference signal 320 is quantized to 1 and the second sample 322 of the pre-stored reference signal 320 is quantized to 1. In this case, the related-art bootstrap detection process multiplies "4" of the first sample 311 of the input signal 310 and "1" of the first sample 321 of the pre-stored reference signal 320 using the multiplier. On the other hand, the bootstrap detector 820 according to the exemplary embodiment may calculate "4" by combining the sign "−" and "1" of the first sample 321 of the pre-stored reference signal 320 using the multiplexer 330.

In addition, the related-art bootstrap detection process multiplies "1" of the second sample 312 of the input signal 310 and "1" of the second sample 322 of the pre-stored reference signal 320 using the multiplier. On the other hand, the bootstrap detector 820 according to the exemplary embodiment may output "1" of the second sample 322 of the pre-stored reference signal 320 as it is using the multiplexer 330.

That is, the bootstrap detector 820 quantizes the input signal 310 and the pre-stored reference signal 320 to one of the values −1, 0, and 1, and thus outputs "0" in response to one of the values included in the input signal 310 and the pre-stored reference signal 320 on the sample basis being 0, outputs "1" in response to the values included in the input signal 310 and the pre-stored reference signal 320 on the sample basis being equal to each other on the assumption that the values are not 0, and outputs "4" in response to the values being different from each other.

In addition, the multiplexer 330 rather than the multiplier may be enough to perform the above-described process.

Meanwhile, the information on the input signal 310 and the pre-stored reference signal 320 may be stored in a buffer on the sample basis.

For example, since N is a length of a window used for determining the correlation and the size of the sample unit is 2 bits because the input signal 310 and the pre-stored reference signal 320 are quantized, the buffer for storing the information on the quantized input signal 310 on the sample basis requires a size of 2*N which is the length N of the window multiplied by the 2 bits of the sample unit size of the input signal 310, and the buffer for storing the information on the quantized reference signal 320 on the sample basis requires a size of 2*N which is the length N of the window multiplied by the 2 bits of the sample unit size of the pre-stored reference signal 320. Accordingly, the buffer for storing the information on the quantized input signal 310 and the quantized reference signal 320 on the sample basis has the size of 4*N.

In addition, as described above, the bootstrap includes a real number part and an imaginary number part. Since the correlation is determined for the real number part and the imaginary number part of the bootstrap, the correlation between the quantized input signal 310 and the quantized reference signal 320 is determined in relation to the real number part of the bootstrap, and in relation to the imaginary number part of the bootstrap. As a result, the total size of the buffer for storing the information on the quantized input signal 310 and the quantized reference signal 320 on the sample basis is 8*N, which is two times the size of 4*N described above, considering the real number part and the imaginary number part of the bootstrap.

Comparing the method of the present disclosure and the related-art bootstrap detection process in relation to the size of the buffer, the size of the buffer necessary in the related-art bootstrap detection process is 4*L*N, whereas the size of the buffer required by the bootstrap detector 820 according to the exemplary embodiment is 8*N. Therefore, the size of the buffer required by the bootstrap detector 820 according to the exemplary embodiment is relatively small unless the input signal 310 and the pre-stored reference signal 320 are quantized and thus the size of each sample is 2 bits.

Meanwhile, as described above in FIG. 8B, the receiving apparatus 800 according to the exemplary embodiment includes the first buffer 840 and the second buffer 850. The first buffer 840 may store the information on the quantized input signal on the sample basis, and the second buffer 850 may store the information on the quantized reference signal on the sample basis.

That is, in the above-described example, the buffer required by the bootstrap detector 820 according to the exemplary embodiment may include the first buffer 840 which has the size of 4N bits to store the information on the quantized input signal 310 on the sample basis, and the second buffer 850 which has the size of 4N bits to store the information on the quantized reference signal 320 on the sample basis.

In addition, in determining the correlation, the bootstrap detector 820 according to the exemplary embodiment uses the multiplexer 330 rather than the multiplier, and, considering that the hardware area of the multiplier is larger than the hardware area of the multiplexer, the hardware area of the bootstrap detector 820 according to the exemplary embodiment is reduced in comparison to the hardware area necessary in the related-art bootstrap detection process.

Meanwhile, the number of adders required to determine the correlation, which is log 2(N), is the same as the number of adders used in the related-art bootstrap detection process.

In addition, in FIG. 12, the bootstrap detector 820 quantizes by dividing the input signal 310 and the pre-stored reference signal 320 into three levels and assigning the values of −1, 0, and 1 to the divided levels. However, the bootstrap detector 820 may quantize by dividing the input signal 310 and the pre-stored reference signal 320 into five levels and assigning the values of −2, −1, 0, 1, and 2 to the divided levels as described in FIG. 10.

In particular, in response to the input signal 310 being divided into three levels and quantized, the size of the sample of the quantized signal may be two bits, and, in response to the input signal 310 being divided into five levels and quantized, the size of the sample of the quantized signal may be three bits.

In addition, according to another exemplary embodiment the bootstrap detector 820 may determine a correlation between an input signal and a reference signal by superposing a correlation between a quantized input signal and the reference signal and a correlation between a quantized reference signal and the input signal onto each other.

Figure 13:
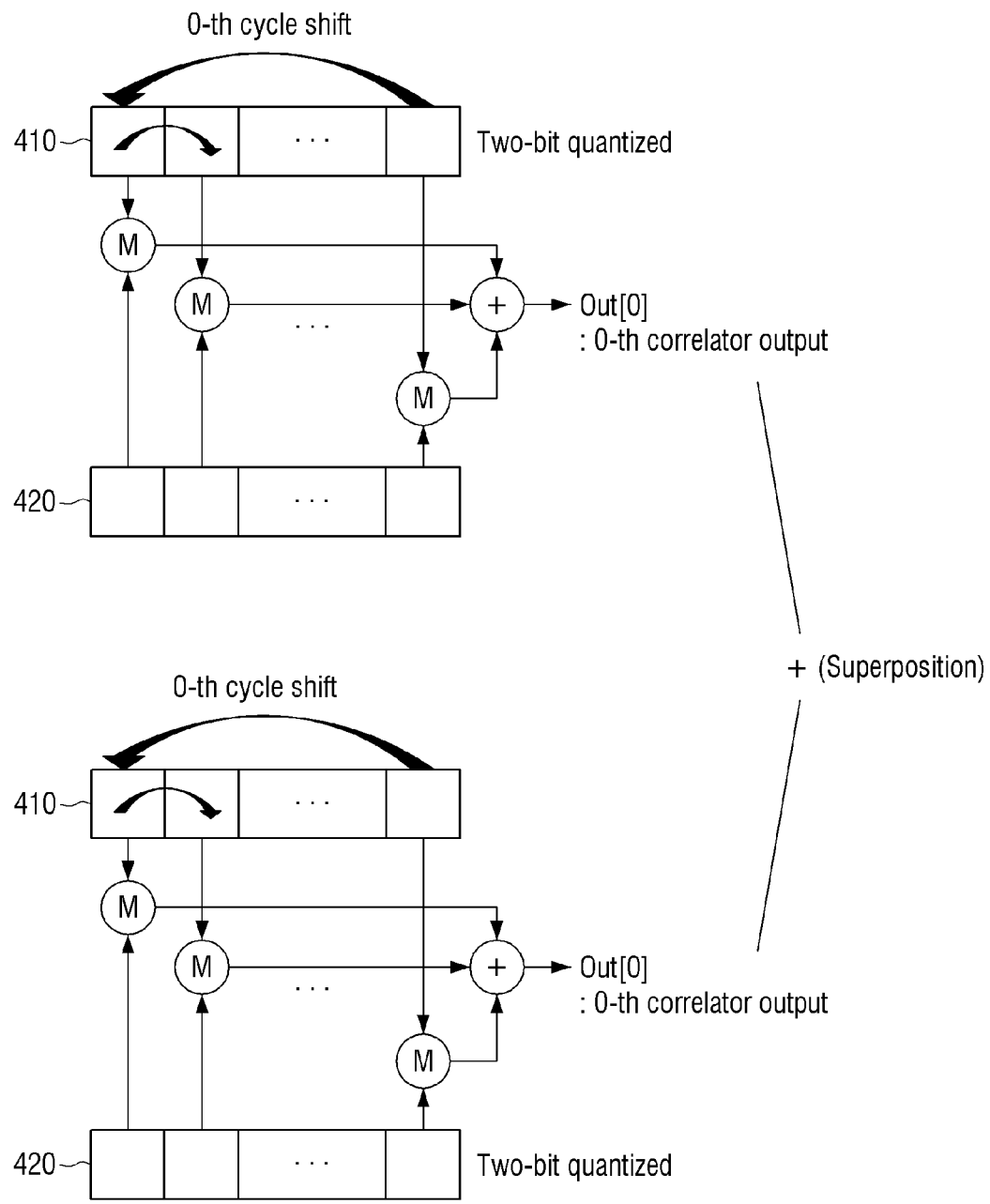
FIG. 13 is a diagram to illustrate a bootstrap detection process, according to another exemplary embodiment.

FIG. 13 is a diagram to illustrate a bootstrap detection process, according to another exemplary embodiment.

Referring to FIG. 13, the bootstrap detector 820 may quantize an input signal 410 and determine a first correlation between the quantized input signal 410 and a pre-stored reference signal 420.

In addition, the bootstrap detector 820 may quantize the pre-stored reference signal 420 and determine a second correlation between the quantized reference signal 420 and the input signal 410.

The determining the correlation on the sample basis has been described above and thus a detailed description thereof is omitted. In addition, the term "two-bit quantized" written in FIG. 13 is defined as having the same meaning as the quantizing the input signal 410 or the pre-stored reference signal 420 as described above.

In addition, the bootstrap detector 820 may determine a final correlation between the input signal 410 and the pre-stored reference signal 420 by superposing the first correlation and the second correlation onto each other.

Considering that the total size of a buffer required to store the information on the quantized input signal 210 and the pre-stored reference signal 220 on the sample basis in FIG. 11 is 2LN+4N as described above, the total size of the buffer of this exemplary embodiment is 2*(2LN+4N), which is the sum of the size of the buffer (2LN+4N) required to store the information on the quantized input signal 410 and the pre-stored reference signal 420 on the sample basis in response to the bootstrap detector 820 determining the correlation between the quantized input signal 410 and the pre-stored reference signal 420, and the size of the buffer (2LN+4N) required to store the information on the quantized reference signal 420 and the input signal 410 on the sample basis in response to the bootstrap detector 820 determining the correlation between the quantized reference signal 420 and the input signal 410, as shown in FIG. 13.

In addition, the bootstrap detector 820 uses a multiplexer rather than a multiplier, and the number of adders required to calculate the correlation is 2*log 2(N), which is two times the value of log 2(N) described in FIG. 11. This is because the bootstrap detector 820 performs the correlation detection process two times, such as quantizing the input signal 410 and determining the first correlation between the quantized input signal 410 and the pre-stored reference signal 420, and also, quantizing the pre-stored reference signal 420 and determining the second correlation between the quantized reference signal 420 and the input signal 410.

In addition, in FIG. 13, the bootstrap detector 820 quantizes by dividing at least one of the input signal 410 and the pre-stored reference signal 420 into three levels and assigning the values of −1, 0, and 1 to the divided levels. In addition, the bootstrap detector 820 may quantize by dividing at least one of the input signal 410 and the pre-stored reference signal 420 into five levels and assigning the values of −2, −1, 0, 1, and 2 to the divided levels.

The bootstrap detection process according to various exemplary embodiments described above may be expressed by the following equations.

First, the related-art bootstrap detection process described in FIG. 9 may be expressed by Equation 1 presented below:

$$R_{general}(n)=\text{cir\_corr}(in_1,in_2) \quad (1)$$

That is, the correlation may be determined by calculating the correlation between the input signal ($in_1$) and the pre-stored reference signal ($in_2$). Herein, the correlation is calculated using a multiplier as described in FIG. 9.

In addition, the process of determining the correlation by quantizing one of the input signal 210 and the pre-stored reference signal 220 and then multiplexing as described in FIG. 11 may be expressed by Equation 2 presented below:

$$R_{one\_side}(n)=\text{cir\_corr}(Q(in_1),(in_2) \text{ or cir\_cor}(in_1,Q(in_2)) \quad (2)$$

Herein, $Q(in_1)$ refers to quantization of an $in_1$ signal. On an assumption that $in_1$ is the input signal 210 and $in_2$ is the pre-stored reference signal 220, Equation 2 described above implies determining the correlation by quantizing the input signal 210 and then calculating the correlation between the quantized input signal 210 and the pre-stored reference signal 220, or determining the correlation by quantizing the pre-stored reference signal 220 and then calculating the correlation between the quantized reference signal 220 and the input signal 210. Herein, the multiplexer is used to determine the correlation.

In particular, $R_{one\_side}$ means a correlation which is determined after only one of the input signal 210 and the pre-stored reference signal 220 is quantized.

In addition, the process of determining the correlation by quantizing both the input signal 310 and the pre-stored reference signal 320 and then multiplexing as described in FIG. 12 may be expressed by Equation 3 presented below:

$$R_{two\_side}(n)=\text{cir\_corr}(Q(in_1),Q(in_2)) \quad (3)$$

Herein, $Q(in_1)$ refers to quantization of an $in_1$ signal and $Q(in_2)$ refers to quantization of an $in_2$ signal. Therefore, on an assumption that $in_1$ is the input signal 310 and $in_2$ is the pre-stored reference signal 320, Equation 3 described above implies determining the correlation by quantizing both the input signal 310 and the pre-stored reference signal 320 and then calculating the correlation between the quantized input signal 310 and the quantized reference signal 320. Herein, the multiplexer is used to determine the correlation.

In particular, $R_{two\_side}$ means a correlation which is determined after both the input signal 310 and the pre-stored reference signal 320 are quantized.

In addition, the process of determining the final correlation by quantizing the input signal 410 and then determining the first correlation between the quantized input signal 410 and the pre-stored reference signal 420, quantizing the pre-stored reference signal 420 and then determining the second correlation between the quantized reference signal 420 and the input signal 410, and superposing the first correlation and the second correlation onto each other as described above 3 may be expressed by Equation 4 presented below:

$$R_{superposition}(n)=\text{cir\_corr}(Q(in_1),(in_2)+\text{cir\_cor}(in_1,Q(in_2)) \quad (4)$$

Herein, $Q(in_1)$ refers to quantization of an $in_1$ signal and $Q(in_2)$ refers to quantization of an $in_2$ signal. Therefore, on an assumption that $in_1$ is the input signal 410 and $in_2$ is the pre-stored reference signal 420, Equation 4 described above implies determining the final correlation ($R_{superposition}$) by superposing the first correlation between the quantized input signal 410 and the pre-stored reference signal 420 and the second correlation between the quantized reference signal 420 and the input signal 410. Of course, the multiplexer is used to determine the correlation.

Figure 14:
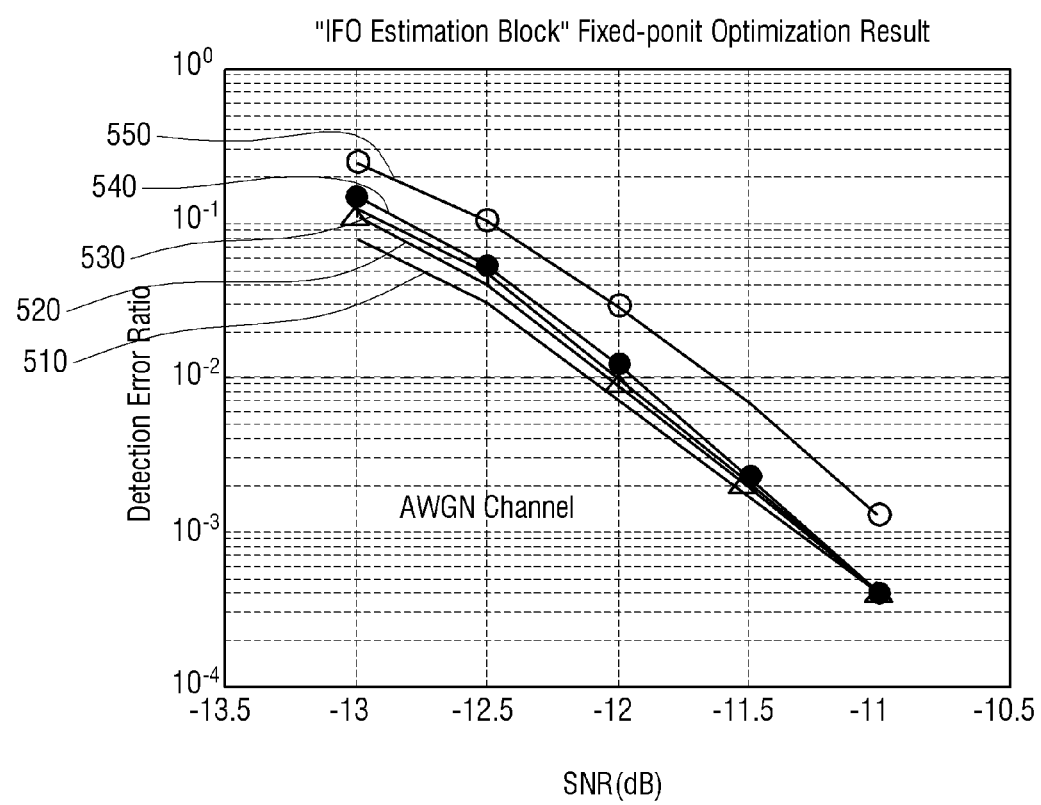
FIG. 14 is a diagram to illustrate integer unit frequency offset estimation performance of a receiving apparatus according to a correlation which is detected after at least one of an input signal and a pre-stored reference signal is quantized, according to an exemplary embodiment.

FIG. 14 is a diagram to illustrate integer unit frequency offset estimation performance of a receiving apparatus according to a correlation which is determined after at least one of an input signal and a pre-stored reference signal is quantized, according to an exemplary embodiment.

Referring to FIG. 14, the horizontal axis shows the size of a signal-to-noise ratio (SNR) and the vertical axis shows an error detection rate. In addition, a first graph 510 shows that a signal is detected, a second graph 520 shows floating-point integer unit frequency offset estimation performance, a third graph 530 shows 7-bit fixed-point integer unit frequency offset estimation performance which uses a multiplier, a fourth graph 540 shows performance when a bootstrap is detected by quantizing one of the input signal and the reference signal and then determining a correlation, and a fifth graph 550 shows performance when a bootstrap is determined by quantizing both the input signal and the reference signal and then determining a correlation.

In particular, comparing the second graph 520 and the fourth graph 540, there is no great difference in the performance. In addition, there is no great difference in the numerical performance between the second graph 520 and the fifth graph 550.

Accordingly, the bootstrap detection method of the exemplary embodiments is not greatly inferior to the related-art bootstrap detection method in view of the performance, and also can reduce a hardware area and reduce the size of a buffer.

Figure 20:
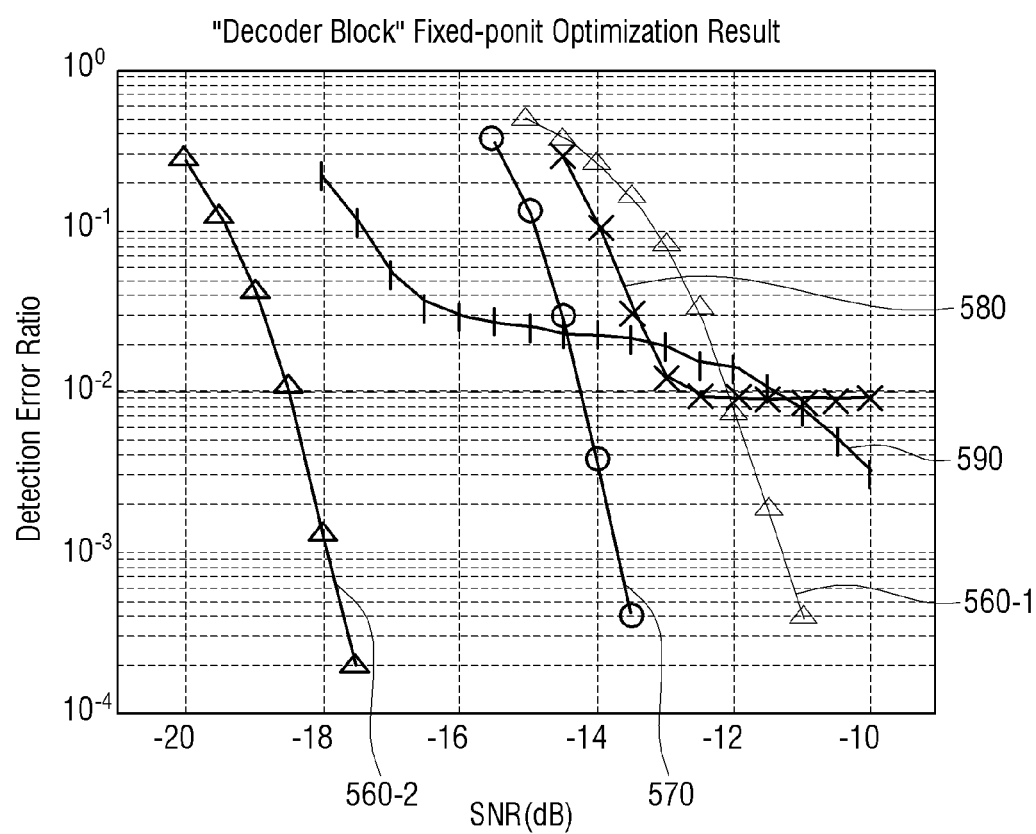
FIG. 20 is a diagram to illustrate decoding performance of a receiving apparatus according to a correlation which is detected after at least one of an input signal and a pre-stored reference signal is quantized, according to an exemplary embodiment.

FIG. 20 is a diagram to illustrate decoding performance of a receiving apparatus according to a correlation which is determined after at least one of an input signal and a pre-stored reference signal is quantized, according to an exemplary embodiment.

Referring to FIG. 20, the horizontal axis shows the size of an SNR and the vertical axis shows an error detection rate. In addition, a first graph 560-1 shows that a signal is detected, a second graph 560-2 shows decoding performance in the case of an ideal signal on an assumption that the signal is detected, a third graph 570 shows decoding performance when a bootstrap is detected by quantizing the input signal and then determining a correlation between the quantized input signal and the reference signal, quantizing the reference signal and then determining a correlation between the input signal and the quantized reference signal, and then superposing the two correlations, a fourth graph 580 shows decoding performance when a bootstrap is detected by quantizing one of the input signal and the reference signal and then determining a correlation, and a fifth graph shows decoding performance when a bootstrap is detected by quantizing both the input signal and the reference signal and then determining a correlation.

Specifically, FIG. 20 shows that the performance shown in the fourth graph 580 and the fifth graph 590 are inferior to the performance of the ideal signal 560-2. However, in the case of the third graph 570, there is a difference of about 4 dB in the SNR from the ideal signal, but the performance of the third graph 570 is about 2 dB better than the performance of the first graph 560-1 which means that the signal is detected. This means that there is no substantial degradation in performance in the decoding process which is performed once a signal has been detected.

Accordingly, the bootstrap detection methods according to the exemplary embodiments are not greatly inferior to the related-art bootstrap detection method in view of the decoding performance, while these embodiments can enable to reduce the hardware area and reduce the size of the buffer. In addition, in FIG. 20, the decoding performance of the receiving apparatus is best when the bootstrap is detected by quantizing the input signal and then determining the correlation between the quantized input signal and the reference signal, quantizing the reference signal and then determining the correlation between the input signal and the quantized reference signal, and then superposing the two correlations. In view of this point, various bootstrap detection methods according to the exemplary embodiments (a method of quantizing at least one of the input signal and the reference signal) may be appropriately applied according to a type of processing performance.

Figure 15:
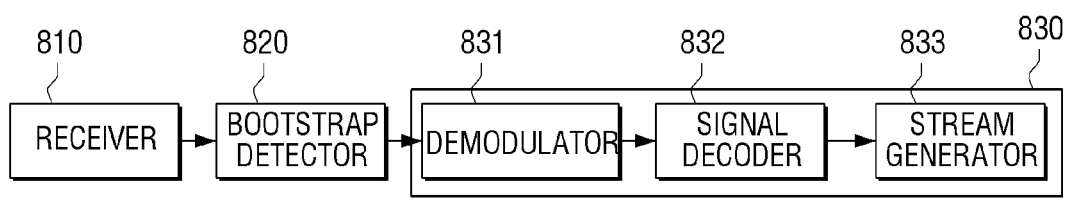
FIG. 15 is a block diagram to illustrate a signal processor in detail, according to an exemplary embodiment.

FIG. 15 is a block diagram provided to explain in detail a signal processor, according to an exemplary embodiment.

Referring to FIG. 15, the signal processor 830 includes a demodulator 831, a decoder 832 and a stream generator 833.

The demodulator 831 performs demodulation according to OFDM parameters from the received RF signals, performs sync-detection, and recognizes whether a currently received frame includes required service data when the sync is detected from signaling information stored in a sync area. For example, the demodulator 831 may recognize whether a mobile frame for a mobile device is received or a fixed frame for a fixed device is received.

In this case, if the OFDM parameters are not previously determined regarding a signaling area and a data area, the demodulator 831 may perform demodulation by obtaining the OFDM parameters regarding the signaling area and the data area stored in the sync area, and obtaining information about the OFDM parameters regarding the signaling area and the data area which are disposed right after the sync area.

The decoder 832 performs decoding on the required data. In this case, the decoder 832 may perform decoding by obtaining parameters of an FEC method and a modulating method regarding the data stored in each data area based on the signaling information. Further, the decoder 832 may calculate positions of the data based on the data information included in a configurable field and a dynamic field. Thus, it may calculate which positions of the frame a requested PLP is transmitted.

The stream generator 833 may generate the data to be served by processing a baseband packet input from the decoder 832.

For example, the stream generator 833 may generate an ALP packet from the baseband packet in which errors are corrected based on an ISSY mode, buffer size (BUFS), time to output (TTO) values and input stream clock reference (ISCR) values.

Specifically, the stream generator 833 may include de-jitter buffers. The de-jitter buffers may regenerate correct timing to restore an output stream based on the ISSY mode, BUFS, TTO values and ISCR values. Thereby, a delay for sync between a plurality of PLPs can be compensated.

Figure 16:
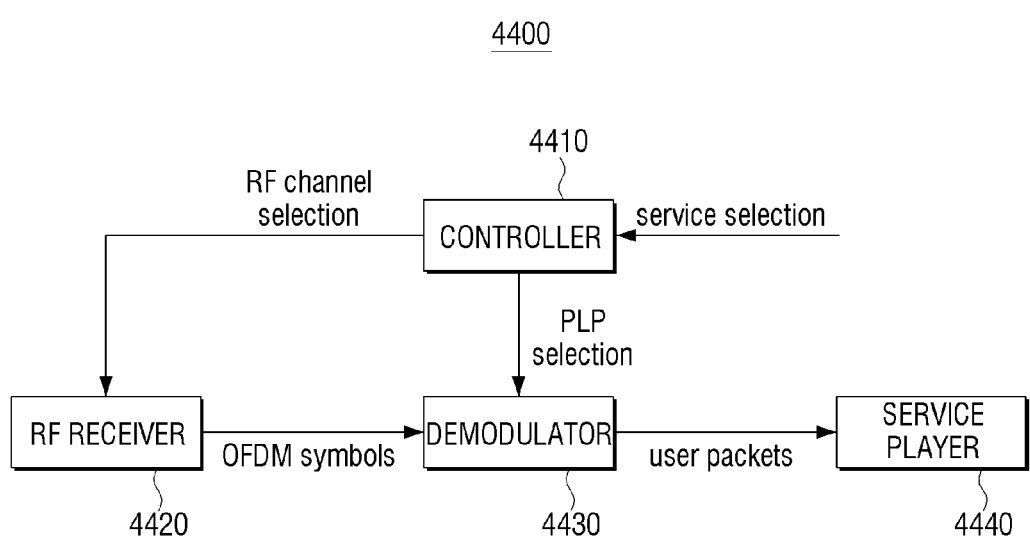
FIG. 16 is a block diagram showing a configuration of a receiver, according to an exemplary embodiment.

FIG. 16 is a block diagram of a receiving apparatus, according to an exemplary embodiment.

Referring to FIG. 16, the receiving apparatus 4400 may include a controller 4410, an RF receiver 4420, a demodulator 4430, and a service player 4440.

The controller 4410 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service are transmitted through one PLP with one RF channel for convenient explanation. Thus, services are provided with a unique data obtaining path to play services, and the data obtaining path is specified by an RF channel and a PLP.

The RF receiver 4420 extracts RF signals from a selected RF channel by the controller 4410, and delivers OFDM symbols, extracted by performing signal-processing of the RF signals, to the demodulator 4430. The signal processing may include synchronization, channel estimation and equalization. Information required for the signal processing is predetermined between a transmitting apparatus and a receiving apparatus or transmitted to the receiving apparatus in a predetermined OFDM symbols among the OFDM symbols.

The demodulator 4430 extracts a user packet by performing signal processing on the OFDM symbols, and delivers to the service player 4440. The service player 4440 plays and outputs the service selected by a user with the user packet. A format of the user packet may be different according to implementing services. For example, a TS packet or an IPv4 packet may be the user packet.

Figure 17:
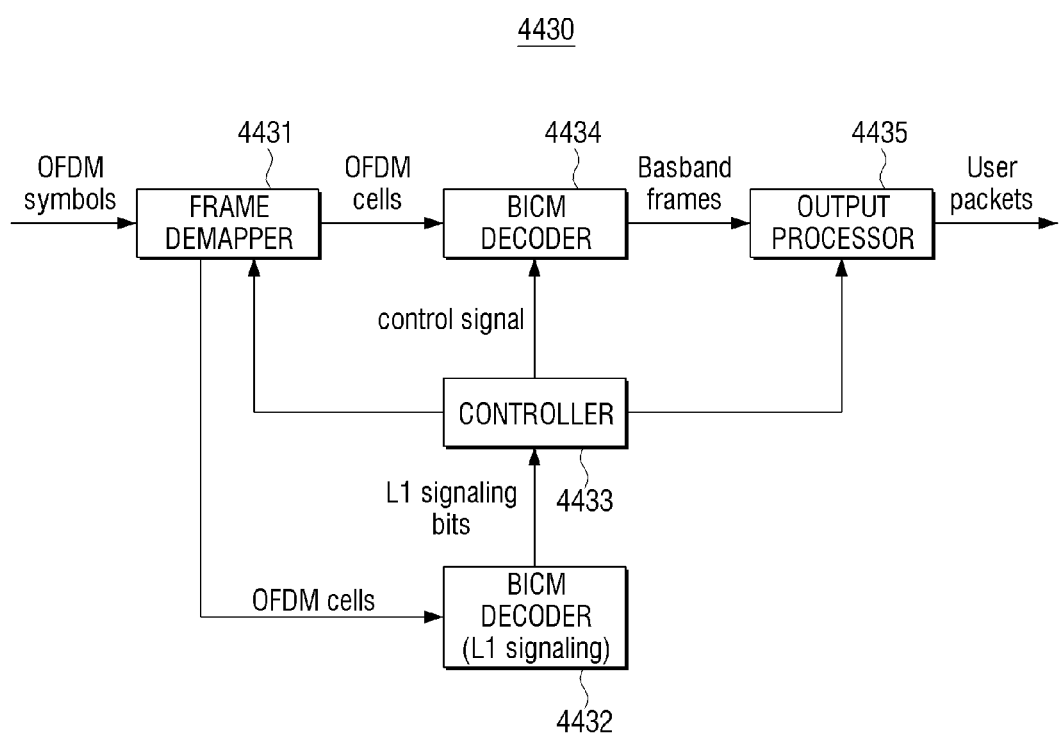
FIG. 17 is a block diagram showing a demodulator in more detail, according to an exemplary embodiment.

FIG. 17 is a block diagram describing the demodulator of FIG. 16, according to an exemplary embodiment.

Referring to FIG. 17, the demodulator 4430 may include a frame demapper 4431, a BICM decoder 4432 for L1 signaling, a controller 4433, a BICM decoder 4434, and an output processor 4435.

The frame demapper 4431 selects OFDM cells constituting FEC blocks belonging to a selected PLP from a frame constituted with OFDM symbols based on controlling information delivered from the controller 4433, and delivers the OFDM symbols to the decoder 4434. Further, the frame demapper 4431 selects OFDM cells corresponding to more than one FEC block included in the L1 signaling, and delivers the OFDM cells to BICM decoder 4432 for the L1 signaling.

The BICM decoder 4432 for the L1 signaling signal-processes the OFDM cells corresponding to the FEC blocks belonging to the L1 signaling, extracts L1 signaling bits, and delivers the L1 signaling bits to the controller 4433. In this case, the signal processing may include extracting log-likelihood ratio (LLR) values for decoding low density parity check (LDPC) codes in OFDM cells, and decoding the LDPC codes by using the extracted LLR values.

The controller 4433 extracts an L1 signaling table from the L1 signaling bits, and controls operations of the frame demapper 4431, the BICM decoder 4434, and the output processor 4435 by using values of the L1 signaling table. FIG. 37 illustrates that the BICM decoder 4432 for the L1 signaling does not use controlling information of the controller 4433 for convenient explanation. However, if the L1 signaling includes a layer structure similar to the L1 pre-signaling and the L1 post-signaling described above, the BICM decoder 4432 for the L1 signaling may be constituted with more than one BICM decoding block, and operations of the BICM decoding blocks and the frame demapper 4431 may be controlled based on upper-layer L1 signaling information, as clearly understood in the above description.

The BICM decoder 4434 signal-processes the OFDM cells constituting FEC blocks belonging to the selected PLP, extracts baseband packets, and delivers the baseband packets to the output processor 4435. The signal processing may include extracting LLR values for coding and decoding LDPC codes in OFDM cells, and decoding the LDPC codes by using the extracted LLR values. These two operations may be performed based on the controlling information delivered from the controller 4433.

The output processor 4435 signal-processes the baseband packets, extracts a user packet, and delivers the extracted user packet to the service player. In this case, the signal processing may be performed on the controlling information delivered from the controller 4433.

Meanwhile, according to an exemplary embodiment, the output processor 1235 may include an ALP packet processor (not illustrated) which extracts an ALP packet from a baseband packet.

Figure 18:
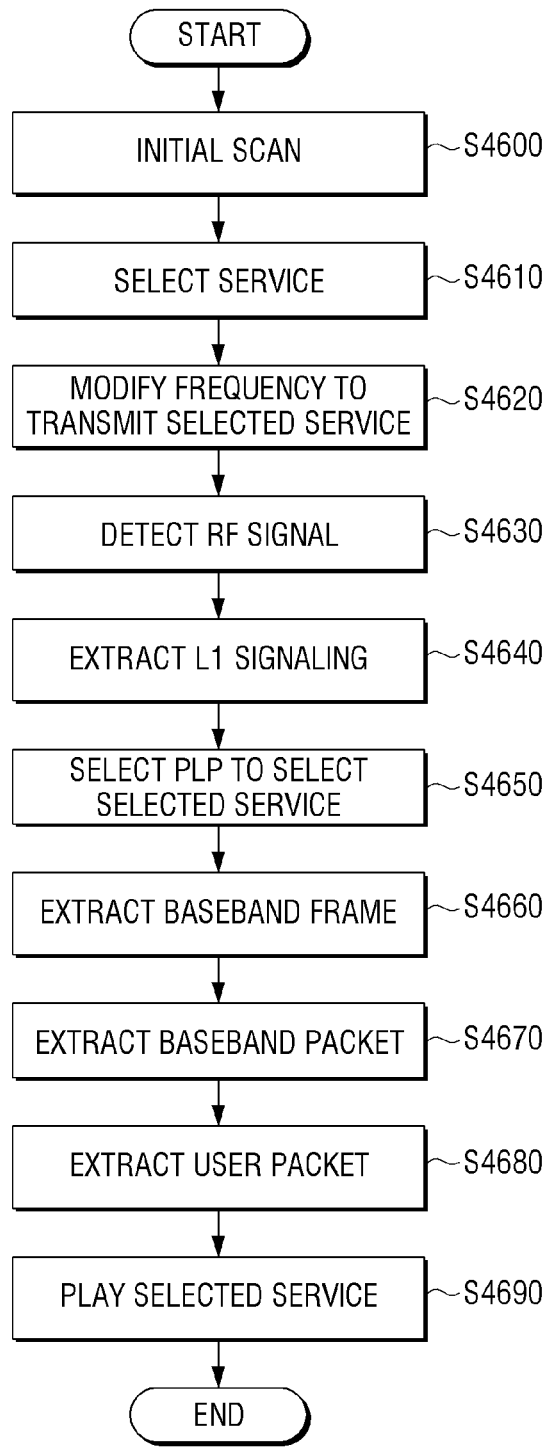
FIG. 18 is a flowchart provided to briefly explain an operation of a receiver from a time point when a user selects a service to a time point when the selected service is played, according to an exemplary embodiment.

FIG. 18 is a flowchart provided to briefly explain an operation of a receiving apparatus from a time point when a user selects a service to a time point when the selected service is played, according to an exemplary embodiment.

It is assumed that service information about all the services that can be selected at an initial scan process of S4600 is obtained prior to a service select process at S4610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and an upper layer signaling.

When a user selects a service at S4610, the receiving apparatus modifies a frequency transmitting the selected service at S4620, and performs extracting RF signals at S4630. While performing S4620 modifying the frequency transmitting the selected service, the service information may be used.

When the RF signals are extracted, the receiver performs S4640 extracting L1 signaling from the extracted RF signals. The receiving apparatus selects the PLP transmitting the selected service by using the extracted L1 signaling at S4650, and extracts baseband packets from the selected PLP at S4660. At S4650 selecting the PLP transmitting the selected service, the service information may be used.

Further, S4660 extracting the baseband packets may include selecting OFDM cells belonging to the PLP by demapping a transmission frame, extracting LLR values for coding/decoding LDPC, and decoding LDPC codes by using the extracted LLR values.

The receiving apparatus performs S4670 extracting an ALP packet from the extracted baseband packet by using header information about the extracted baseband packet, and performs S4680 extracting a user packet from the extracted ALP packet by using header information about the extracted baseband packet. The extracted user packet is used in S1690 playing the selected service. At S4670 extracting the ALP packet and at S4680 extracting the user packet, L1 signaling information obtained at S4640 extracting the L1 signaling may be used. In this case, a process of extracting the user packet from the ALP packet (restoring null TS packet and inserting a TS sync byte) is the same as described above. According to the exemplary embodiments as described above, various types of data may be mapped to a transmittable physical layer and data processing efficiency may be improved.

Figure 19:
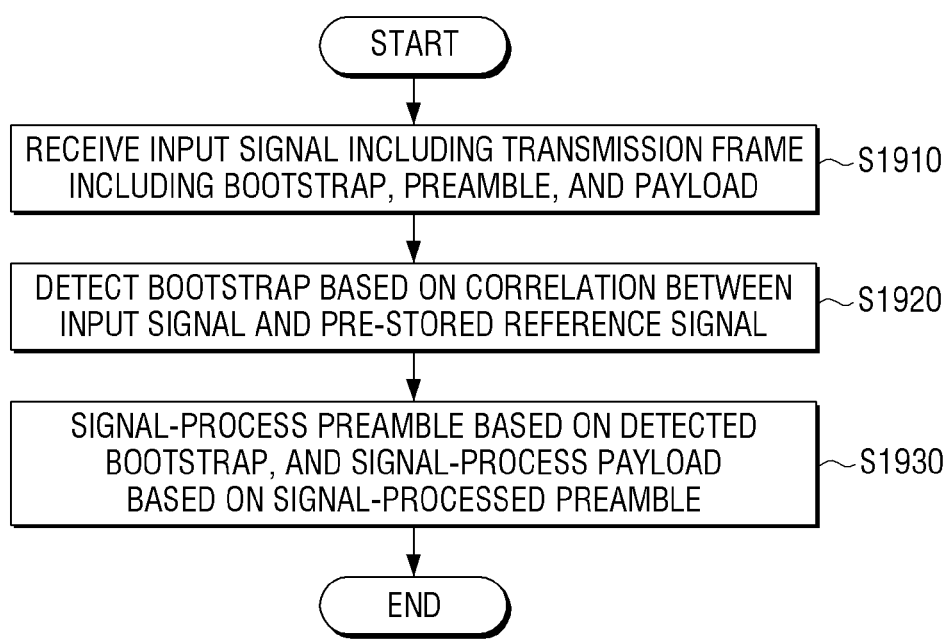
FIG. 19 is a flowchart to illustrate a control method of a receiving apparatus, according to an exemplary embodiment.

FIG. 19 is a flowchart to illustrate a control method of a receiving apparatus, according to an exemplary embodiment.

The control method of the receiving apparatus shown in FIG. 19 receives an input signal including a transmission frame which includes a bootstrap, a preamble, and a payload (S1910).

In addition, the control method detects the bootstrap based on a correlation between the input signal and a pre-stored reference signal (S1920).

Thereafter, the control method signal-processes the preamble based on the detected bootstrap and signal-processes the payload based on the signal-processed preamble (S1930).

Herein, the detecting the bootstrap may include determining the correlation between the input signal and the reference signal by quantizing at least one of the input signal and the pre-stored reference signal and then multiplexing.

In addition, the detecting the bootstrap may include quantizing by dividing at least one of the input signal and the pre-stored reference signal into a plurality of levels and assigning different values to the divided levels.

In addition, the detecting the bootstrap may include quantizing by dividing at least one of the input signal and the pre-stored reference signal into three levels and assigning values of −1, 0, and 1 to the divided levels.

The detecting the bootstrap may include quantizing by dividing at least one of the input signal and the pre-stored reference signal into five levels and assigning values of −2, −1, 0, 1, and 2 to the divided levels.

The detecting the bootstrap may include quantizing the input signal and determining a correlation between the quantized input signal and the reference signal as the correlation between the input signal and the reference signal, or quantizing the reference signal and determining a correlation between the quantized reference signal and the input signal as the correlation between the input signal and the reference signal.

In addition, the detecting the bootstrap may include quantizing both the input signal and the reference signal, and determining a correlation between the quantized input signal and the quantized reference signal as the correlation between the input signal and the reference signal.

In addition, the detecting the bootstrap may include determining the correlation between the input signal and the reference signal by superposing a correlation between the quantized input signal and the reference signal and a correlation between the quantized reference signal and the input signal.

In addition, the detecting the bootstrap may include determining the correlation by dividing each of the input signal and the reference signal into a plurality of samples, and multiplexing on a sample basis.

In response to at least one of the input signal and the pre-stored reference signal being divided into three levels and quantized, the sample of the quantized signal may have a size of two bits, and, in response to at least one of the input signal and the pre-stored reference signal being divided into five levels and quantized, the sample of the quantized signal may have a size of three bits.

In addition, the control method of the receiving apparatus according to an exemplary embodiment may further include: storing information on the input signal in a first buffer on the sample basis; and storing information on the reference signal in a second buffer on the sample basis.

A non-transitory computer readable medium which stores a program for performing the signal processing methods according to the above exemplary embodiments may be provided.

For example, a non-transitory computer readable medium which stores a program for performing the operations of: receiving an input signal including a transmission frame which includes a bootstrap, a preamble, and a payload; detecting the bootstrap based on a correlation between the input signal and a pre-stored reference signal; and signal-processing the preamble based on the detected bootstrap and signal-processing the payload based on the signal-processed preamble, may be provided.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided At least one of the components, elements, modules or units represented by a block as illustrated in FIGS. 2-5A, 7-8B and 15-17 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A receiving apparatus comprising:
a receiver configured to receive a signal; and
a processor configured to:
obtain a first sample signal from the signal and a second sample signal from a reference signal which is pre-stored;
quantize the first sample signal and the second sample signal,
obtain a first correlation between the quantized first sample signal and the obtained second sample signal,
obtain a second correlation between the obtained first sample signal and the quantized second sample signal,
obtain a correlation between the signal and the reference signal based on the first correlation and the second correlation, and process the signal based on the correlation;
wherein the processor is configured to obtain the first correlation by multiplexing the quantized first sample signal and the obtained second sample signal, and obtain the second correlation by multiplexing the obtained first sample signal and the quantized second sample signal.

2. The receiving apparatus of claim 1, wherein the processor is configured to quantize by dividing each of the signal and the reference signal into a plurality of levels and assigning different values to the divided levels.

3. The receiving apparatus of claim 1, wherein the processor is configured to quantize by dividing each of the signal and the reference signal into three levels and assigning values of −1, 0, and 1 to the divided levels.

4. The receiving apparatus of claim 1, wherein the processor is configured to quantize by dividing each of the signal and the reference signal into five levels and assigning values of −2, −1, 0, 1, and 2 to the divided levels.

5. The receiving apparatus of claim 1, wherein the processor is configured to obtain the correlation by superposing the first correlation and the second correlation.

6. The receiving apparatus of claim 1, wherein, if the signal and the reference signal are divided into three levels and quantized, the quantized sample signal has a size of two bits, and wherein, if the signal and the reference signal are divided into five levels and quantized, the quantized sample signal has a size of three bits.

7. The receiving apparatus of claim 1, further comprising: a first buffer configured to store first information on the signal on the sample basis; and a second buffer configured to store second information on the reference signal on the sample basis, wherein at least one of the first information and the second information comprises information on the quantized signal or the quantized reference signal.

8. A control method of a receiving apparatus, the control method comprising:
   receiving a signal;
   obtaining a first sample signal from the signal and a second sample signal from a reference signal which is pre-stored;
   quantizing the first sample signal and the second sample signal;
   obtaining a first correlation between the quantized first sample signal and the obtained second sample signal;
   obtain a second correlation between the obtained first sample signal the quantized second sample signal;
   obtaining a correlation between the signal and the reference signal based on the first correlation and the second correlation; and processing the signal based on the correlation;
   wherein the obtaining the first correlation and the second correlation comprises:
      obtaining the first correlation by multiplexing the quantized first sample signal and the obtained second sample signal; and
      obtaining the second correlation by multiplexing the obtained first sample signal and the quantized second sample signal.

9. The control method of claim 8, wherein the quantizing divides the signal and the reference signal into a plurality of levels, and assigns different values to the divided levels.

10. The control method of claim 8, wherein the quantizing divides the signal and the reference signal into three levels, and assigns values of −1, 0, and 1 to the divided levels.

11. The control method of claim 8, wherein the quantizing comprises dividing at least one of the signal and the reference signal into five levels and assigning values of −2, −1, 0, 1, and 2 to the divided levels.

12. The control method of claim 8, wherein the obtaining the correlation obtains the correlation by superposing the first correlation and the second correlation.

13. The control method of claim 8, wherein, if the signal and the reference signal are divided into three levels and quantized, the quantized sample of the quantized signal has a size of two bits, and wherein, if the input signal and the reference signal are divided into five levels and quantized, the quantized sample signal has a size of three bits.

14. The control method of claim 8, further comprising: storing first information on the signal in a first buffer on the sample basis; and storing second information on the reference signal in a second buffer on the sample basis, wherein at least one of the first information and the second information comprises information on the quantized signal or the quantized reference signal.

* * * * *